(12) United States Patent
de Cremoux et al.

(10) Patent No.: US 10,581,328 B2
(45) Date of Patent: Mar. 3, 2020

(54) SYNCHRONOUS RECTIFIER FOR BUCK CONVERTER WITHOUT THE NEED FOR A COMPARATOR

(71) Applicant: Dialog Semiconductor (UK) Limited, London (GB)

(72) Inventors: Guillaume de Cremoux, Edinburgh (GB); Nicolas Borfigat, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/626,237

(22) Filed: Jun. 19, 2017

(65) Prior Publication Data

US 2017/0294839 A1    Oct. 12, 2017

Related U.S. Application Data

(62) Division of application No. 14/618,205, filed on Feb. 10, 2015, now Pat. No. 9,685,868.

(51) Int. Cl.
*H02M 3/157* (2006.01)
*H02M 3/158* (2006.01)
*H02M 1/08* (2006.01)
*H02M 1/00* (2006.01)
*H02M 3/156* (2006.01)

(52) U.S. Cl.
CPC ......... *H02M 3/1588* (2013.01); *H02M 1/083* (2013.01); *H02M 3/157* (2013.01); *H02M 2001/0009* (2013.01); *H02M 2001/0025* (2013.01); *H02M 2003/1566* (2013.01); *Y02B 70/1466* (2013.01)

(58) Field of Classification Search
CPC .... H02M 3/1588; H02M 3/157; H02M 1/083; H03K 17/13
See application file for complete search history.

(56) References Cited

U.S. PATENT DOCUMENTS

| | | |
|---|---|---|
| 7,446,513 B2 | 11/2008 | Dikken et al. |
| 7,952,336 B2 | 5/2011 | Brinkman |
| 8,030,909 B2 | 10/2011 | Ma et al. |
| 8,624,571 B2 | 1/2014 | da Silva et al. |
| 8,648,583 B2 | 2/2014 | Brown et al. |
| 2004/0257051 A1* | 12/2004 | Kiep .................. H02M 3/1588 323/222 |

(Continued)

OTHER PUBLICATIONS

"Digital PWM/PFM Controller with Input Voltage Feed-Forward for Synchronous Buck Converters," by Xu Zhang et al., 2008 IEEE, 978-1-4244-1874-9/08, Feb. 24, 2008, pp. 523-528.

(Continued)

*Primary Examiner* — Harry R Behm
(74) *Attorney, Agent, or Firm* — Saile Ackerman LLC; Stephen B. Ackerman

(57) ABSTRACT

A switch mode power supply, which functions in a continuous current mode and a discontinuous mode employing a zero crossing control circuit for determining a polarity of an inductor current and from the polarity of the inductor current, controlling an operational state of a switching section of the switch mode power supply such that the inductor current becomes approximately zero amperes at the end of each demagnetization phase of operation.

12 Claims, 13 Drawing Sheets

(56) References Cited

U.S. PATENT DOCUMENTS

| | | | |
|---|---|---|---|
| 2007/0085520 A1* | 4/2007 | Ho | H02M 3/1588 323/282 |
| 2008/0012540 A1* | 1/2008 | Chen | H02M 1/38 323/224 |
| 2008/0136383 A1* | 6/2008 | Hasegawa | H02M 3/1588 323/271 |
| 2008/0290854 A1* | 11/2008 | Uchiike | H02M 3/1588 323/284 |
| 2009/0295350 A1* | 12/2009 | Yamada | H02M 3/1588 323/282 |
| 2010/0301827 A1* | 12/2010 | Chen | H02M 3/156 323/299 |
| 2011/0018515 A1* | 1/2011 | McCloy-Stevens | H02M 3/1588 323/284 |
| 2011/0241633 A1 | 10/2011 | Herzer et al. | |
| 2013/0002212 A1 | 1/2013 | Fan | |
| 2014/0210445 A1* | 7/2014 | Hasegawa | H04W 48/04 323/284 |
| 2015/0145489 A1* | 5/2015 | Hou | H02M 3/1588 323/271 |

OTHER PUBLICATIONS

"Synchronized Zero-Crossing-Based Self-Tuning Capacitor Time Constant Estimator for Low-Power Digitally Controlled DC-DC Converters," by Aleksandar Radic, et al., IEEE Transactions on Power Electronics, vol. 29, No. 10, Oct. 2014, pp. 5106-5110.

"A 0.6-V Input 94% Peak Efficiency CCM/DCM Digital Buck Converter in 40-nm CMOS with Dual-Mode-Body-Biased Zero-Crossing Detector," by Xin Zhang, et al., 2013 IEEE, 978-1-4799-0280-4/13, Nov. 11, 2013, pp. 45-48.

* cited by examiner

SYNCHRONOUS RECTIFIER FOR BUCK CONVERTER WITHOUT THE NEED FOR A COMPARATOR

The present invention is a divisional application that claims priority under 35 U.S.C. § 120 from U.S. patent application Ser. No. 14/618,205, filing date Feb. 10, 2015, now U.S. Pat. No. 9,685,868, issued Jun. 20, 2017, incorporated herein by reference in its entirety.

TECHNICAL FIELD

This disclosure relates generally to switch mode power conversion. More particularly, this disclosure relates to methods and apparatuses for controlling switches of a switch mode voltage regulator to maintain an inductor current at zero ampere at an end of a demagnetization phase of operation.

BACKGROUND

A buck converter consists of a power stage and a feedback control circuit. The power stage has a switching section and an output filter. The power stage switches an input node of the output filter between the power supply voltage source and the ground reference node. The output filter has an inductor between the input node and an output node with a capacitor connected between the output node and the ground reference node. The switching section in this example has a switch connected between the power supply voltage source and the input node of the output filter. A diode is connected between the input node of the output filter and the ground reference node. When the switch is activated, the current through the filter section flows from the power supply voltage source and when the switch is deactivated, the current flows from the ground reference node to the input of the filter section.

FIG. 1 is a schematic diagram of a buck converter of the related art having a continuous current mode (CCM) of operation. The power switching section 5 receives a set of clock pulses CLK that are generated at a fixed repetition rate. The clock pulses CLK are applied to the set input S of a set-reset latch RS1. The output Q of the set-reset latch RS1 is applied to the control terminal of the high side switch SH. A first terminal of the high side switch SH is connected to the input voltage source VIN and a second terminal of the high side switch SH is connected to an input terminal of the filter section 10. The input terminal is a first terminal of an inductor L1. When the clock pulses CLK as applied to the set input S of a set-reset latch RS1, triggers the set-reset latch RS1 such that the high side switch SH is closed such that a current from the input voltage source VIN flows to the first terminal of the inductor L1. The current IL flows through the inductor L1 and out the second terminal of the inductor L1. The second terminal of the inductor L1 is connected is to the first terminal of the capacitor $C_{OUT}$. The second terminal of the capacitor $C_{OUT}$ is connected to the ground reference node. The current flowing in the inductor L1 flows into the capacitor $C_{OUT}$ to charge the capacitor $C_{OUT}$ and to bypass any alternating current and voltage variations to the ground reference node. The load current is a DC current passing to an external load. The output voltage $V_{OUT}$ is present at the junction of the second terminal of the inductor L1 and the first terminal of the output capacitor $C_{OUT}$.

It is known in the art, that the voltage ($V_{L1}$) across the inductor L1 is determined by the formula:

$$V_{L1} = L\frac{dI_L}{dt}$$

The output voltage VOUT is equal to the difference of the power supply voltage source and the voltage VL1 across the inductor L1 in the on state. When the high side switch is opened, the slope of the current through the inductor L1 is the negative of the output voltage VOUT divided by the inductance of the inductor L1 (−VOUT/L1). The duty cycle of the current mode buck converter determines the on-state time and the off-state time. It can be shown that the output voltage VOUT is equal to the duty cycle D of the buck converter multiplied by the voltage level of the input voltage source VIN.

The feedback section 15 has two inputs. The first input is the output voltage $V_{OUT}$ at the first terminal of the output capacitor $C_{OUT}$ and the second input is a sensing of the output current through the inductor L1. In some applications, the sensing of the output current $I_{OUT}$ is measured as a voltage across the equivalent series resistance of the inductor L1, a voltage across a small series resistor (not shown) placed in series with the inductor L1, or a voltage resulting from a magnetic coupling with an interconnection of the inductor L1 and the output capacitor $C_{OUT}$.

The first input of the feedback section 15 is applied to first input of an error amplifier OA1. A second input of the error amplifier OA1 receives a reference voltage level Vref. The output the error amplifier OA1 is an error voltage that is applied to a negative input of a comparator CP1. The inductor current IL sensor $SENS_{IL}$ senses the inductor current IL at the first terminal LX, transfers the sensed inductor current to the second input of the feedback section 15. The sensed inductor current is applied to the input of the resistor network $R_S$ to form the voltage VLX that is proportional to the voltage developed at the first terminal LX at the output of the resistor network $R_S$. The voltage LX is a first input to a summation circuit 16. A compensation voltage is a second input to the summation circuit 16. The summation signal ILFB of the output of the summation circuit 16 is the second input to the comparator CP1. The output of the comparator CP1 is the stop signal STOP that is applied to the reset of the set-reset latch RS1. The output Q of the set-reset latch RS1 is a pulse width signal PWM that activates and deactivates the high side switch. When the error voltage $V_{EA}$ indicates that the output voltage $V_{OUT}$ is greater than the reference voltage level Vref, the comparator CP1 triggers the reset input R of the set-reset latch RS1 to deactivate the high side switch. The slope of the output current the reverses direction and the output current decreases at the slope determined by the magnitude of the output voltage $V_{OUT}$ and value of the inductor L1. At the next pulse of the clock pulses CLK, the high side switch is toggled in state to generate a saw tooth current wave for the inductor current IL. The output VEA of the error amplifier OA1 sets the target for the maximum or peak inductor current IL. The output VEA is regulated by the error amplifier OA1 to adjust the required peak inductor current IL to regulate the output voltage VOUT to a value proportional to reference voltage VREF.

When the high side switch SH is deactivated, it presents a high impedance from its first terminal to its second terminal. Since the current flowing in the inductor L1 cannot change instantaneously, the current is redirected from high side switch SH to the low side diode switch SL. Due to the positive inductor current, the voltage across the inductor L1 reverses polarity until low side diode switch SL becomes forward biased and begins conducting current. The voltage at the input terminal LX of the filter section becomes $-(V_d)$ where the quantity $V_d$ is the forward voltage drop of low side diode switch SL. The voltage present at the output terminal OUT of the filter section 10 is still the output voltage VOUT. The inductor current IL, now flows from the ground reference node through low side diode switch SL and to the output capacitor CL and to the output load. During the period that the high side switch SH is deactivated, the magnitude of the voltage applied across the inductor L1 is constant and equal to $(VOUT+V_d+IL \times R_L)$. The voltage across the inductor L1 is negative causing the inductor current IL to decrease during the period that the high side switch SH is deactivated. Since the applied voltage is essentially constant, the inductor current IL decreases linearly.

FIG. 2 provides plots of the inductor current IL of the buck converter of FIG. 1 under high load, medium load, and light load conditions with only continuous conduction mode (CCM) of operation. At the rising edge of the clock pulse CLK at the time $\tau_0$, the set input S of the set-reset latch RS1 sets the output Q of the set-reset latch RS1 to activate the high side switch SH. The inductor current IL begins to rise from its minimum level at the time $\tau_0$. The inductor current IL increases until the voltage ILFB that is proportional to the filter current IL is greater than the error voltage VEA and the high side switch SH is deactivated at the time $\tau_1$. The inductor current IL then begins to decrease until the next rising edge of the clock pulse CLK. The change in the inductor current IL is essentially a ripple current that swings around the level of the high load current 20, the medium load current 25, and the low load current 30. Under the high load current 20, the inductor current IL does not have a level that is less than zero amps.

Under the medium load current 25, the inductor current IL is less than the level of zero amps between the points 27 and 29. At the time $\tau_0$, the set input S of the set-reset latch RS1 sets the output Q of the set-reset latch RS1 to activate the high side switch SH and the inductor current IL begins to increase. When the inductor current IL is less than the level of zero amps between the points 27 and 29, energy is lost from the system, because the energy is dissipated in the high side switch SH and the low side diode switch SL.

Under the light load current 30, the inductor current IL is less than the level of zero amps between the points 32 and 34. Again, at the time $\tau_0$, the set input S of the set-reset latch RS1 sets the output Q of the set-reset latch RS1 to activate the high side switch SH and the inductor current IL begins to increase. When the inductor current IL is less than the level of zero amps between the points 32 and 34, energy is again lost from the system, because the energy is dissipated in the high side switch SH and the low side diode switch SL. The inductor current IL in a buck converter operating in only a CCM shows a significant amount of negative inductor current that draws current from the capacitor CL at each clock cycle. This negative current causes Ohmic losses and shortens battery life in portable applications.

FIG. 3 is a schematic diagram of a buck converter of the related art having a continuous current mode (CCM) and discontinuous current mode (DCM) of operation. Since the losses from continuous current flowing in the continuous current mode (CCM) become significant at the low current load 30 of FIG. 2, a low side synchronous rectifier switch SR replaces the passive low side diode switch SL to prevent the negative current. The synchronous rectifier switch SR is often referred to as an active diode or a zero-crossing detector in many examples. In this instance of the buck converter, the high side switch SH and the synchronous rectifier switch SR are each formed of a metal oxide semiconductor (MOS) field effect transistor (FET) N1 and N2. In parallel with each of the MOS FET's N1 and N2 is a body diode $D_{B1}$ and $D_{B2}$ that are connected from the source to the drains of the MOSFET's N1 and N2. As is known in the art, the body diodes $D_{B1}$ and $D_{B2}$ are intrinsic diodes formed between the drain and the back-gate of the MOSFET's N1 and N2.

The input voltage source VIN is connected to the first electrode of the MOSFET N1 and the cathode of the body diode $D_{B1}$. The second electrode of the MOSFET N1 and the anode of the body diode $D_{B1}$ are connected to the first electrode of the MOSFET N2 and the cathode of the body diode $D_{B2}$. The second electrode of the MOSFET N2 and the anode of the body diode $D_{B2}$ are connected to the ground reference node.

The high side switch SH and the low side synchronous rectifier switch SR are controlled respectively by the high side driver output $Q_H$ and a low side driver output $Q_L$ of the switch control circuit 7. The gate of the MOSFET N1 is connected to the high side driver output $Q_H$ and the gate of the MOSFET N2 is connected to the low side driver output $Q_L$. The switch control circuit 7 receives the CCM stop command 35 from the output of the comparator CP1 and the DCM Stop command 40 from the output of the zero crossing detector 17. A possible implementation of the zero crossing detector 17 is to determine when the voltage $V_{LX}$ at the input node LX of the inductor L1 in less than zero volts and the inductor current IL has crossed the zero amp level. When the clock pulses CLK arrive at the switch control circuit, the high side switch SH is activated to provide the inductor current from the input voltage source VIN through the first terminal to the second terminal of the high side switch SH. When the inductor current IL has reached the maximum level as indicated by the comparison of the summation signal ILFB from the output of the summation circuit 16 with the error voltage VEA, the comparator CP1 activates the CCM stop command 35 and the high side switch SH is deactivated. The low side synchronous rectifier switch SR is activated and the inductor current IL is then sourced from the ground reference node. The zero crossing detector 17 is activated when the voltage $V_{LX}$ at the input node LX of the inductor L1 becomes less than zero volts. When the inductor current IL becomes less than zero, the zero crossing detector 17 activates the DCM stop command 40 and the low side synchronous rectifier switch SR is deactivated. Both the high side switch SH and the low side synchronous rectifier switch SR are now deactivated. The inductor current IL will then remain at zero amps.

FIG. 4 provides plots of the inductor current IL of the buck converter of FIG. 3 under high load, medium load, and light load conditions with continuous conduction mode (CCM) and discontinuous conduction mode (DCM) of operation emulating ideal diode rectification. Refer first to the high load current 20 situation. At the rising edge of the clock pulse CLK at the time $\tau_0$, the rising edge of the clock CLK applied to the input of the switch control circuit 7 within the switching section 5 causes the high side driver output Q to activate the high side switch SH. The inductor current IL begins to rise from its minimum level at the time $\tau_0$. The inductor current IL increases until the voltage ILFB that is proportional to the filter current IL is greater than the error voltage VEA at the time $\tau_1$. The inductor current IL then begins to decrease until the next rising edge of the clock pulse CLK. The change in the inductor current IL is essentially a ripple current that swings around the level of the high load current 20, the medium load current 25, and the low load current 30. Under the high load current 20, the inductor current IL does not have a level that is less than zero amps and is operating in the continuous current mode.

Refer now to the medium load current 25 situation. As before the inductor current IL begins to rise from its minimum level at the time $\tau_0$. The inductor current IL increases until the voltage ILFB that is proportional to the filter current IL is greater than the error voltage VEA at the time $\tau_2$. The inductor current IL then begins to decrease until the zero crossing detector 17 determines that the voltage $V_{LX}$ at the input node LX of the inductor L1 is greater than the zero volts at the time $\tau_3$. The zero crossing detector activates the DCM stop command 40 and the switch control circuit 7 sets the low side driver output $Q_L$ to deactivate the low side synchronous rectifier switch SR. In ideal diode operation, the inductor current IL will remain at nearly zero amps until the next cycle start at time $\tau_0$.

Refer now to the light load current 30 situation. As before the inductor current IL begins to rise from its minimum level at the time $\tau_0$. The inductor current IL increases until the voltage ILFB that is proportional to the filter current IL is greater than the error voltage VEA at the time $\tau_4$. The inductor current IL then begins to decrease until the zero crossing detector 17 determines that the inductor voltage $V_{LX}$ at the input node LX of the inductor L1 is greater than zero at the time $\tau_5$. The zero crossing detector activates the DCM stop command 40 and the switch control circuit 7 sets the low side driver output $Q_L$ to deactivate the low side synchronous rectifier switch SR. In ideal diode operation, the inductor current IL will remain at nearly zero amps until the next cycle start at time $\tau_0$.

FIG. 5 provides plots of the inductor current IL and the voltage $V_{LX}$ at the input node LX of the inductor L1 of the buck converter of FIG. 3 under medium load conditions with continuous conduction mode (CCM) and discontinuous conduction mode (DCM) of operation emulating non ideal diode rectification. The zero crossing detector 17 is implemented using a comparator that will compare the voltage $V_{LX}$ at the input node LX of the inductor L1 with a defined reference voltage VREF2. As in FIG. 4 for the medium load current 25 situation, the inductor current IL begins to rise from its minimum level at the time $\tau_0$ at the rising edge of the clock CLK. The high side switch SH is turned on and the low side synchronous rectifier switch SR is turned off, thus magnetizing the inductor L1. The inductor current IL increases until the voltage ILFB that is proportional to the filter current IL is greater than the error voltage VEA at the time $\tau_1$. The inductor current IL then begins to decrease, as the inductor L1 demagnetizes with the high side switch SH deactivated and the low side synchronous rectifier switch SR is turned on. At the time $\tau_1$, the voltage $V_{LX}$ at the input node LX of the inductor L1 becomes positive and activates the zero crossing detector 17. The zero crossing detector 17 monitors the inductor current IL to determine when it has approached approximately zero amps. The zero crossing detector 17 activates the DCM stop command 40 and the switch control circuit 7 sets the low side driver output $Q_L$ to deactivate the low side synchronous rectifier switch SR at the time $\tau_2$. The inductor current IL continues to flow as shown between time $\tau_2$ and time $\tau_3$. During the period between time $\tau_2$ and time $\tau_3$, the voltage $V_{LX}$ is held less than zero volts. At the time $\tau_3$, the inductor current IL becomes approximately the zero volt level and the voltage $V_{LX}$ is set to the output voltage VOUT. The inductor current IL will remain at nearly zero amps until the next cycle start at time $\tau_4$.

At the next cycle start at time $\tau_4$, the inductor current IL begins to rise from its minimum level until the time $\tau_5$. The inductor current IL then begins to decrease, as the inductor L1 demagnetizes with the high side switch SH deactivated and the low side synchronous rectifier switch SR is turned on. At the time $\tau_5$, the voltage $V_{LX}$ at the input node LX of the inductor L1 becomes greater than zero volts to activate the zero crossing detector 17. The zero crossing detector 17 monitors the inductor current IL to determine when it has approached approximately zero amps, at the time $\tau_6$. The zero crossing detector 17 activates the DCM stop command 40 and the switch control circuit 7 sets the low side driver output $Q_L$ to deactivate the low side synchronous rectifier switch SR at the time $\tau_6$. The inductor current IL continues to flow as shown between time $\tau_6$ and time $\tau_7$. During the period between time $\tau_6$ and time $\tau_7$, the voltage $V_{LX}$ is held at approximately zero volts and the inductor current IL continues decrease below zero amps to the time $\tau_7$. At the time $\tau_7$, the inductor current IL begins to rise to zero amps at the time $\tau_8$. Between the time $\tau_7$ and time $\tau_8$, the voltage $V_{LX}$ rises to the level somewhat above the input voltage VIN due to the voltage drop across the body diode $D_{B1}$. At the time $\tau_8$, the inductor current IL is approximately the zero volt level and the voltage $V_{LX}$ is set to the output voltage VOUT between the time $\tau_8$ and the time $\tau_9$.

In this example, the cycle between the time $\tau_9$ and the time $\tau_{14}$ is identical to that of the cycle between the time $\tau_4$ and the time $\tau_9$. Similarly, the cycle between the time $\tau_{14}$ and the time $\tau_{17}$ is identical to that of the cycle between the time $\tau_0$ and the time $\tau_3$. Between the time $\tau_2$ and time $\tau_4$, the inductor current IL was still slightly positive when the low side synchronous rectifier switch SR is deactivated. The inductor L1 behaves as a current source for the inductor current IL and the inductor current IL flows through the body diode $D_{B2}$. The voltage $V_{LX}$ thus is set to the voltage level of approximately −0.7V. Alternately, between the time $\tau_6$ and time $\tau_8$, the inductor current IL was still slightly negative when the low side synchronous rectifier switch SR is deactivated. The inductor L1 behaves as a current source for the inductor current IL and the inductor current IL flows through the body diode $D_{B1}$. The inductor current is injected toward the input node LX of the inductor L1 thus forcing the voltage $V_{LX}$ to be set to approximately to the input voltage VIN plus +0.7V (VIN+0.7V).

SUMMARY

An object of this disclosure is to provide a switch mode power supply that delays an onset of a discontinuous mode of operation with an auto-adaptive digitally controlled delay that requires no trimming or calibration in order to compensate offset and delays.

Another object of this disclosure is to provide a switch mode power supply with a digitally controlled synchronous rectifier for controlling an operational state of the switched mode power supply such that the inductor current becomes approximately zero amperes at an end of each demagnetization phase under low load.

To accomplish at least one of these objects, a switch mode power supply has a feedback section configured for sensing a load current of an output of the switch mode power supply, sensing a voltage at an input terminal of a filter section of switch mode power supply to determine if a negative current is flowing in the inductor, and sensing an operational state of the switching section of the switch mode power supply. The feedback section is further configured for observing when the inductor current has become negative and providing control signals for deactivating a current sinking switch within the switching section of the switch mode power supply for setting the inductor current at approximately zero amperes at the end of the demagnetization phase of the inductor current.

The feedback section has a continuous current control circuit that is configured for receiving a clocking signal, feedback signals from the output of the switch mode power supply, a current limit signal indicating that a maximum current to be provided by the switch mode power supply has been reached, and generating a magnetization signal and a demagnetization signal for activating a current sourcing switch commonly referred to as high side switch and the current sinking switch commonly referred to as low side switch of the switching section of the switch mode power supply during the continuous current mode of the switch mode power supply.

The feedback section further has a zero crossing control circuit that is configured for receiving the clocking signal, a current sourcing switch status signal from the continuous current control section to determine the state of the current sourcing switch, and a demagnetization signal from the continuous control section for determining when the current sinking switch is to be deactivated. The zero crossing circuit is further configured to receive an inductor input voltage signal indicating a level of the voltage present at an input of the filter section of the switch mode power supply. The zero crossing is connected for receiving a delayed current sinking switch deactivation signal indicating the current sinking switch has been deactivated at a previous time. The zero crossing circuit then determines when the inductor input voltage signal is crossing a zero voltage level and is activated. The zero crossing circuit monitors the inductor input voltage signal to determine when the current sinking switch is to be deactivated in the next cycles.

The feedback section has an adjustable digital delay circuit that is configured for generating the current sinking switch deactivation signal. The adjustable digital delay circuit delays the current sinking switch deactivation signal for a period of time to prevent the current sinking switch from turning off prematurely. The adjustable digital delay circuit is in communication with the zero crossing circuit to receive the current sinking switch deactivation signal that is delayed by a low side driver disabled flag generator. The delay from the adjustable digital delay circuit insures that the current sinking switch is deactivated after a delay to prevent a voltage overshoot at the output of the switch mode power supply.

The feedback section has a state machine that is configured for receiving the magnetization signal and a demagnetization signal for the continuous current mode and the demagnetization signal for the discontinuous current mode. The state machine is configured for providing the current sourcing switch activation signal and the current sinking switch activation signal to the switching section of the switch mode power supply. The state machine determines the timing of the activation and deactivation of the current sourcing switch activation signal and the current sinking switch activation signal based on the state of the magnetization signal and a demagnetization signal for the continuous current mode from the continuous current control circuit and the demagnetization signal for the discontinuous current mode from the zero crossing circuit.

In other embodiments, an apparatus accomplishes at least one of these objects by performing a method for digitally controlling a synchronous rectifier for monitoring a demagnetization mode of operation and determines a polarity of an inductor current within the switch mode power supply for controlling an operational state of a switching section of the switch mode power supply such that the inductor current becomes approximately zero amperes at the end of a demagnetization phase of operation. The method begins with the step of determining when the switch mode power supply is entering the continuous current mode demagnetization phase of operation. When the switch mode power supply has entered the continuous current mode demagnetization phase of operation, a discontinuous current mode demagnetization mode of operation is declared established. At this time, a delay time is reset to its base delay.

An inductor input voltage signal indicating a level of the voltage present at an input of the filter section of the switch mode power supply is sensed. A current sinking switch is examined to determine if it has been deactivated after a period of time. When the current sinking switch is deactivated, the sensed inductor input voltage signal is determined to be greater than or less than a reference voltage. If the inductor input voltage signal is greater than the reference voltage, the current through the inductor is of a first polarity. Conversely, if the inductor input voltage signal is less than the reference voltage, the inductor current is of a second polarity.

During an initialization of the switch mode power supply, a counter is initialized to a predetermined level. When the current sourcing switch is deactivated, the counter is incremented or decremented based on a polarity of the inductor current. The inductor current is sensed as a voltage at the first terminal of the inductor. The output of the counter is the programming input to a delay circuit. The delay circuit is initiated and at the end of the delay time, the control circuit deactivates the current sinking switch. The inductor current is maintained at approximate a zero ampere level.

DETAILED DESCRIPTION

A switch mode power supply of this disclosure functions in a continuous current mode and a discontinuous mode and employs a digitally controlled delay to control inductor current in a demagnetization phase of operation for maintaining the inductor current near the zero ampere level at the end of the demagnetization phase of operation. The auto-adaptive digitally controlled adjusts an onset of discontinuous mode of operation. The digitally controlled delay requires no trimming or calibration in order to compensate offset and delays. The digitally controlled delay is incorporated to control a digitally controlled synchronous rectifier to maintain the inductor current at approximately the zero ampere level.

Figure 1:
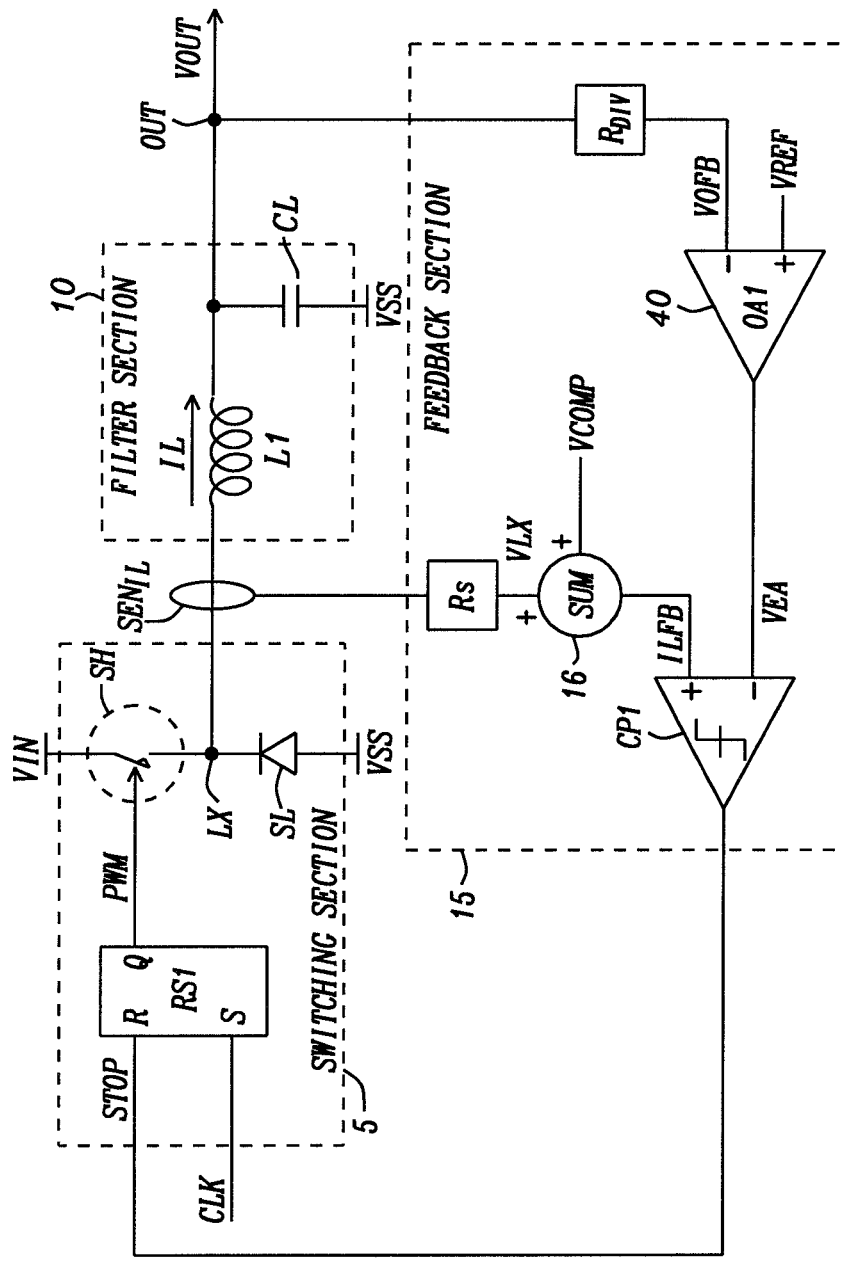
FIG. 1 is a schematic diagram of a switch mode power supply operating as a buck converter of the related art having a continuous current mode (CCM) of operation.
Figure 2:
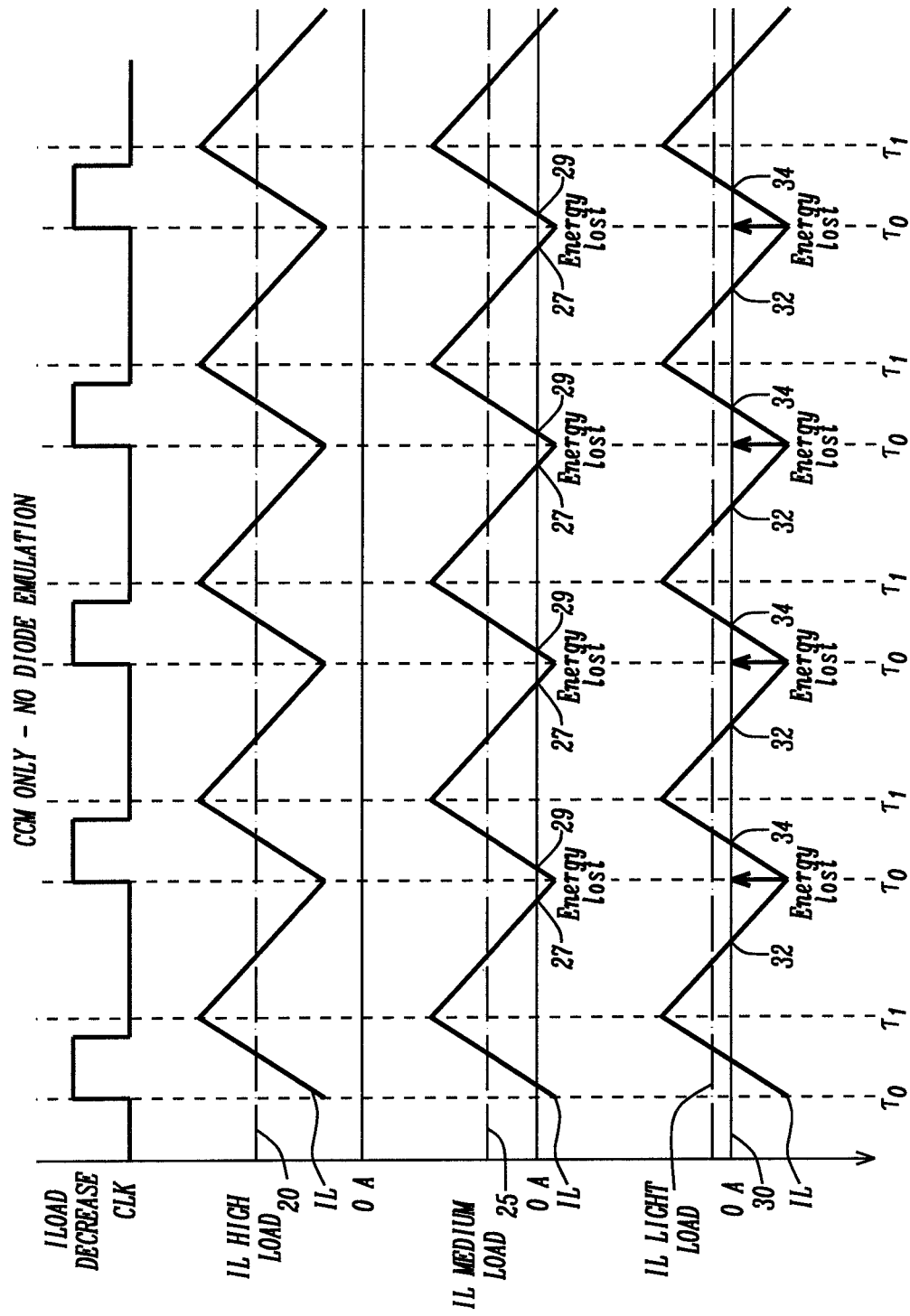
FIG. 2 provides plots of the inductor current IL of the buck converter of FIG. 1 under high load, medium load, and light load conditions with only continuous conduction mode (CCM) of operation.
Figure 3:
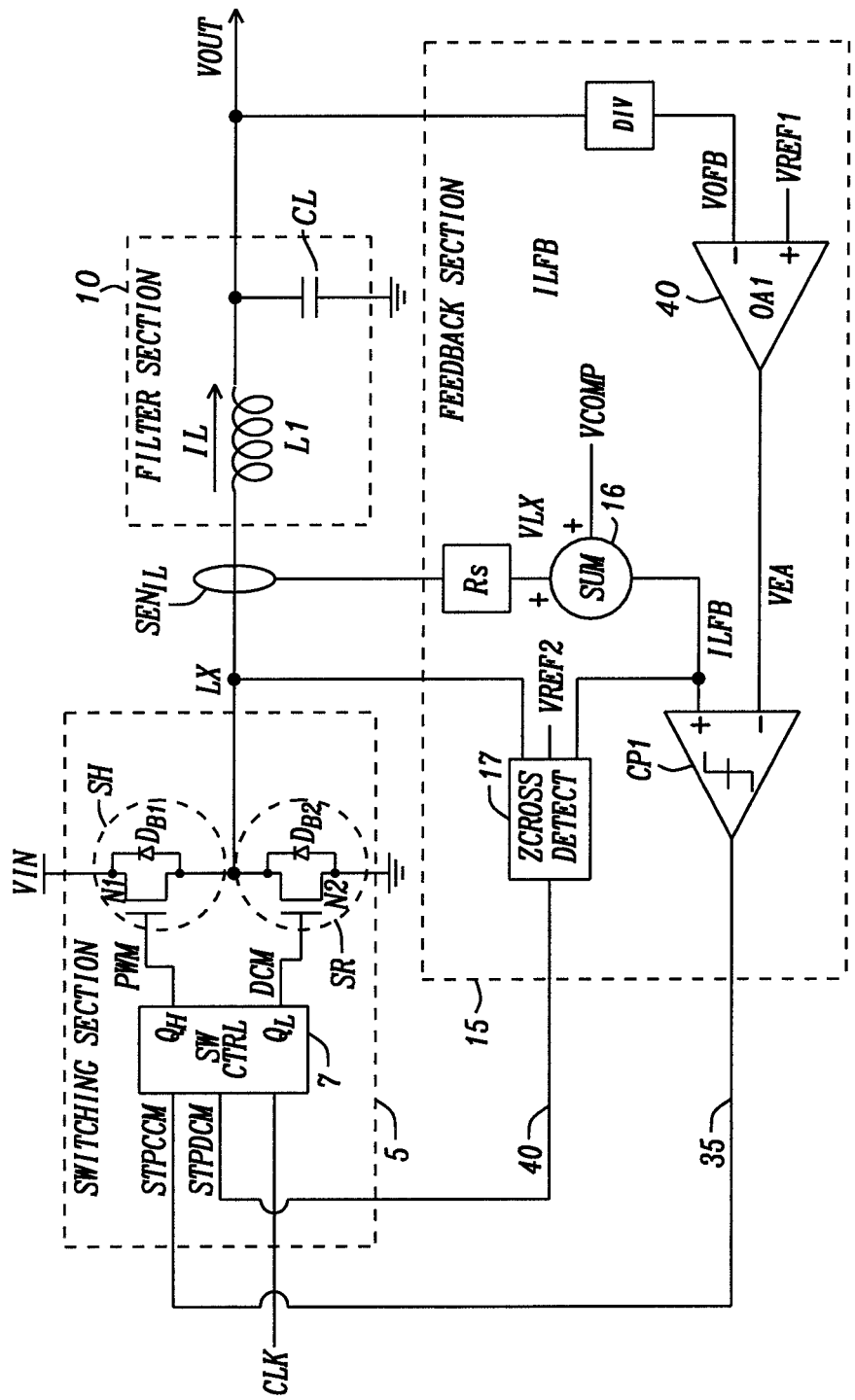
FIG. 3 is a schematic diagram of a buck converter of the related art having a continuous current mode (CCM) and discontinuous current mode (DCM) of operation.
Figure 4:
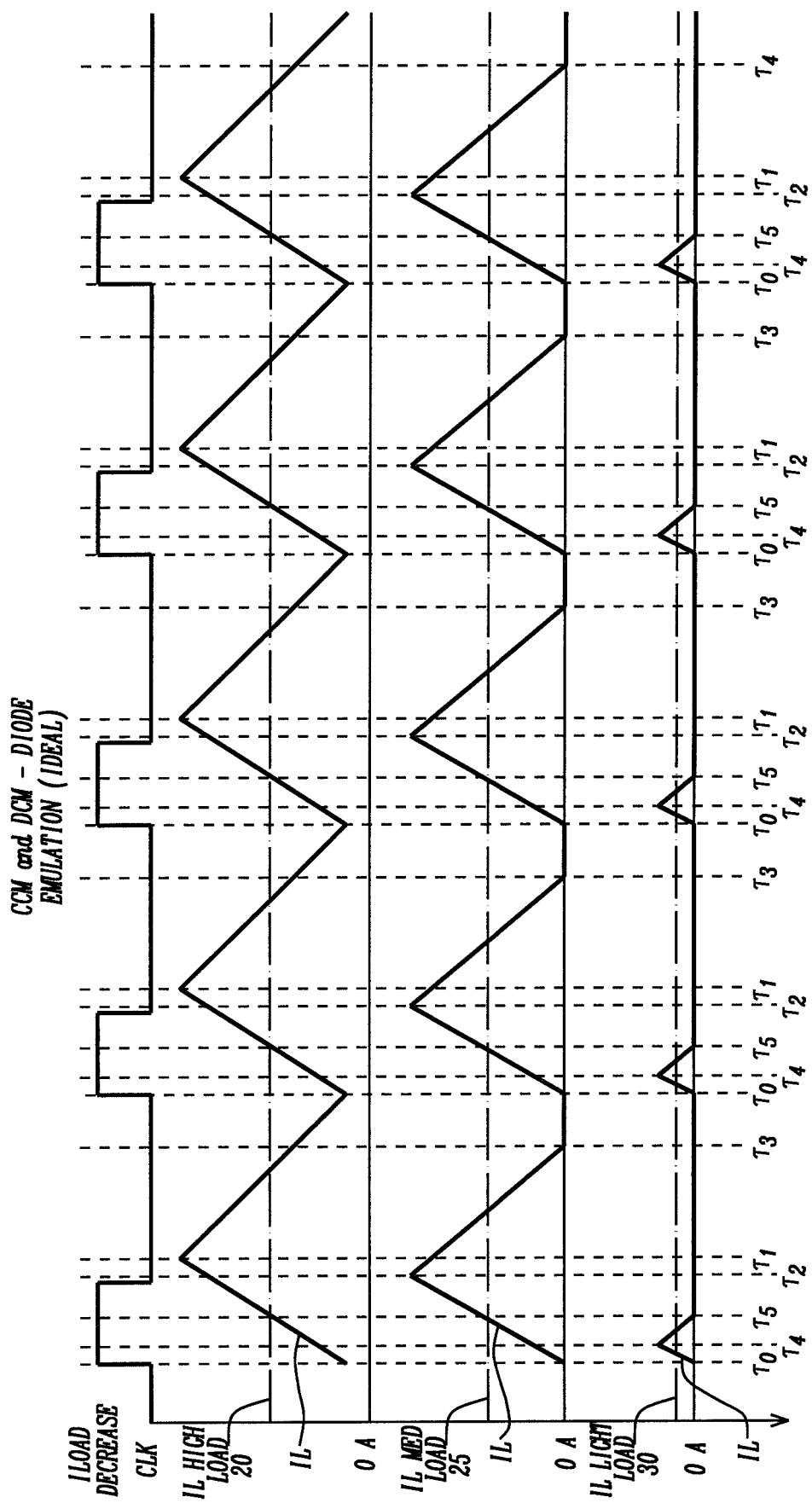
FIG. 4 provides plots of the inductor current of the buck converter of FIG. 3 under high load, medium load, and light load conditions with continuous conduction mode (CCM) and discontinuous conduction mode (DCM) of operation emulating ideal diode rectification.
Figure 5:
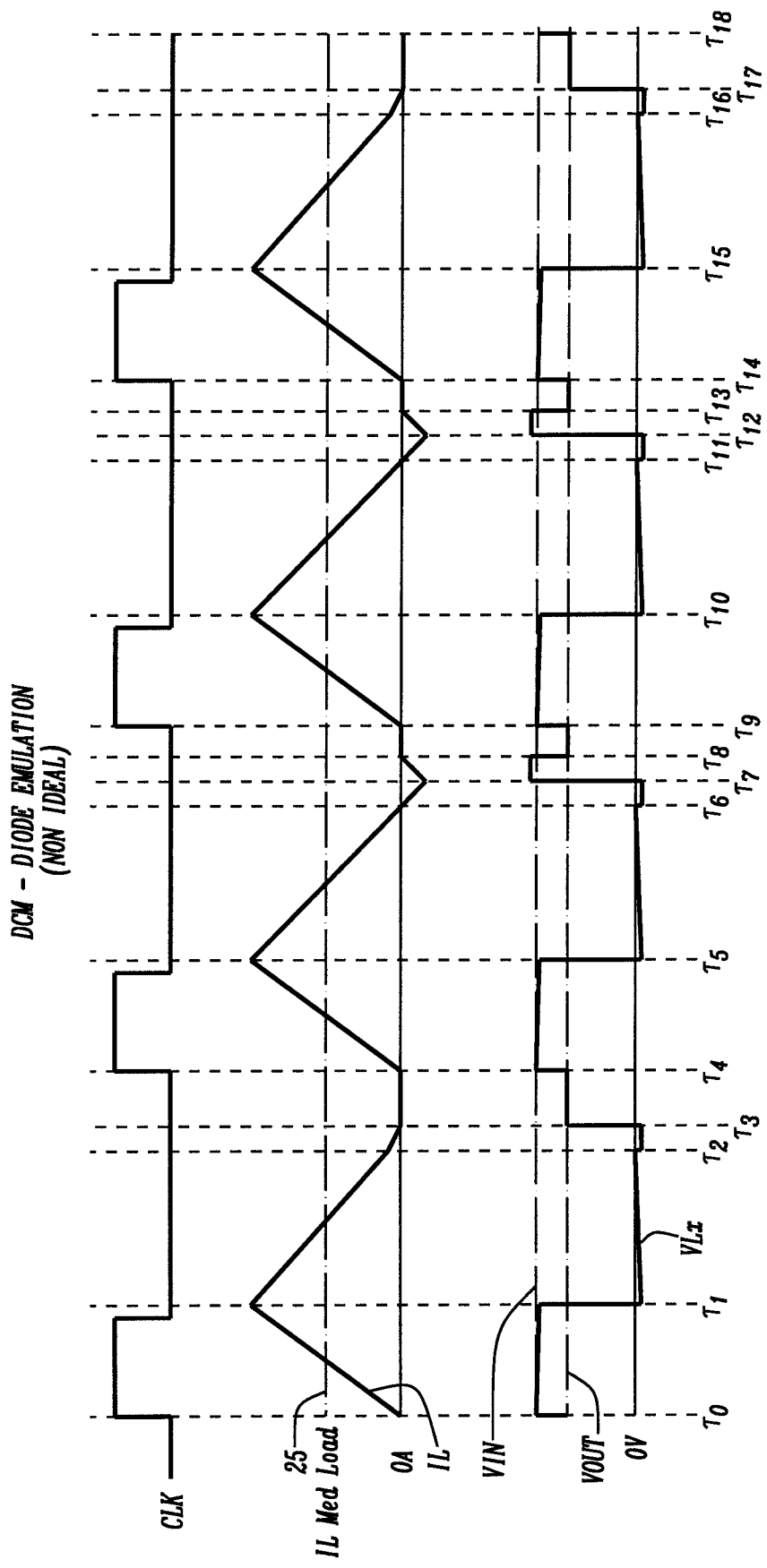
FIG. 5 provides plots of the inductor current and the voltage at the input node of the inductor of the buck converter of FIG. 3 under medium load conditions with continuous conduction mode (CCM) and discontinuous conduction mode (DCM) of operation emulating non-ideal diode rectification.
Figure 6:
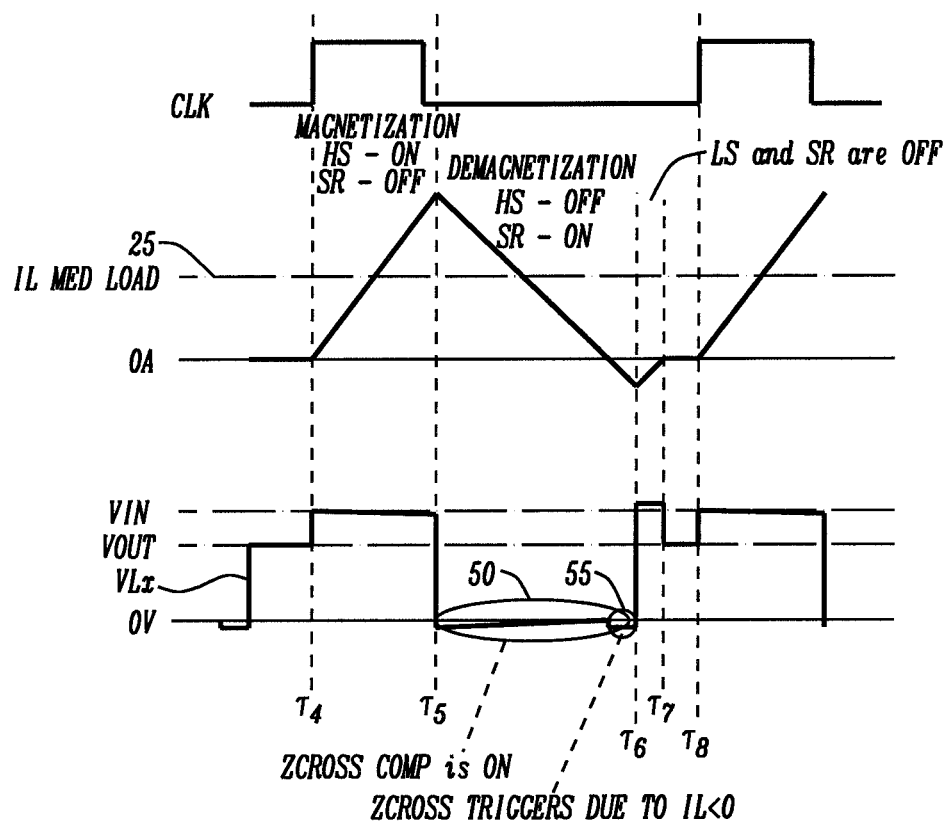
FIG. 6 provides plots of the inductor current and the voltage at the input node of the inductor of the buck converter of FIG. 3 under medium load conditions as shown in FIG. 6 magnified for one clock period of the related art.

FIG. 6 provides plots of the inductor current IL and the voltage $V_{LX}$ at the input node LX of the inductor L1 of the buck converter of FIG. 3 under medium load conditions as shown in FIG. 5 magnified for one clock CLK period of the related art. The clock CLK cycle period illustrated is from the time $\tau_4$ and the time $\tau_8$. Between the time $\tau_4$ and the time $\tau_5$, the high side switch SH activated and the low side synchronous rectifier switch SR is turned off and the inductor L1 is magnetizing. At the time $\tau_5$, the high side switch SH deactivated and the low side synchronous rectifier switch SR is turned on and the inductor L1 is demagnetizing. During the period 50 between the time $\tau_5$ and the time $\tau_6$, the zero crossing detector 17 is activated to sense when the inductor current IL crosses the zero amp level 55 at the time $\tau_6$. Between the time $\tau_6$ and the time $\tau_8$, the high side switch SH and the low side synchronous rectifier switch SR are deactivated.

When the high side switch SH and the low side synchronous rectifier switch SR are both deactivated, the inductor current IL continues to flow through the inductor L1. Consequently, the body diode $D_{B1}$ of the high side switch SH or body diode $D_{B2}$ of the low side synchronous rectifier switch SR will conduct the current. A precise synchronous rectifier will trigger only when the inductor current IL is negative very close to zero amps. Due to process, temperature and other non-idealities, the low side synchronous rectifier switch SR can trigger to be deactivated when inductor current IL is positive. If the low side synchronous rectifier switch SR is deactivated when the inductor current IL is positive then the body diode $D_{B2}$ of the low side synchronous rectifier switch SR will conduct and the voltage $V_{LX}$ is found by the equation:

$V(Lx)=-Vbe\sim=-0.7V.$

Conversely, if the low side synchronous rectifier switch SR is deactivated when the inductor current IL is negative then the body diode $D_{B1}$ of the high side synchronous rectifier switch SR will conduct and the voltage $V_{LX}$ is found by the equation:

$V(Lx)=VIN+Vbe\sim=VIN+0.7V$

Once both high side switch SH and the low side synchronous rectifier switch SR are deactivated and the inductor current IL has reached level of zero amps then:

$V(Lx)=VOUT$

Figure 7:
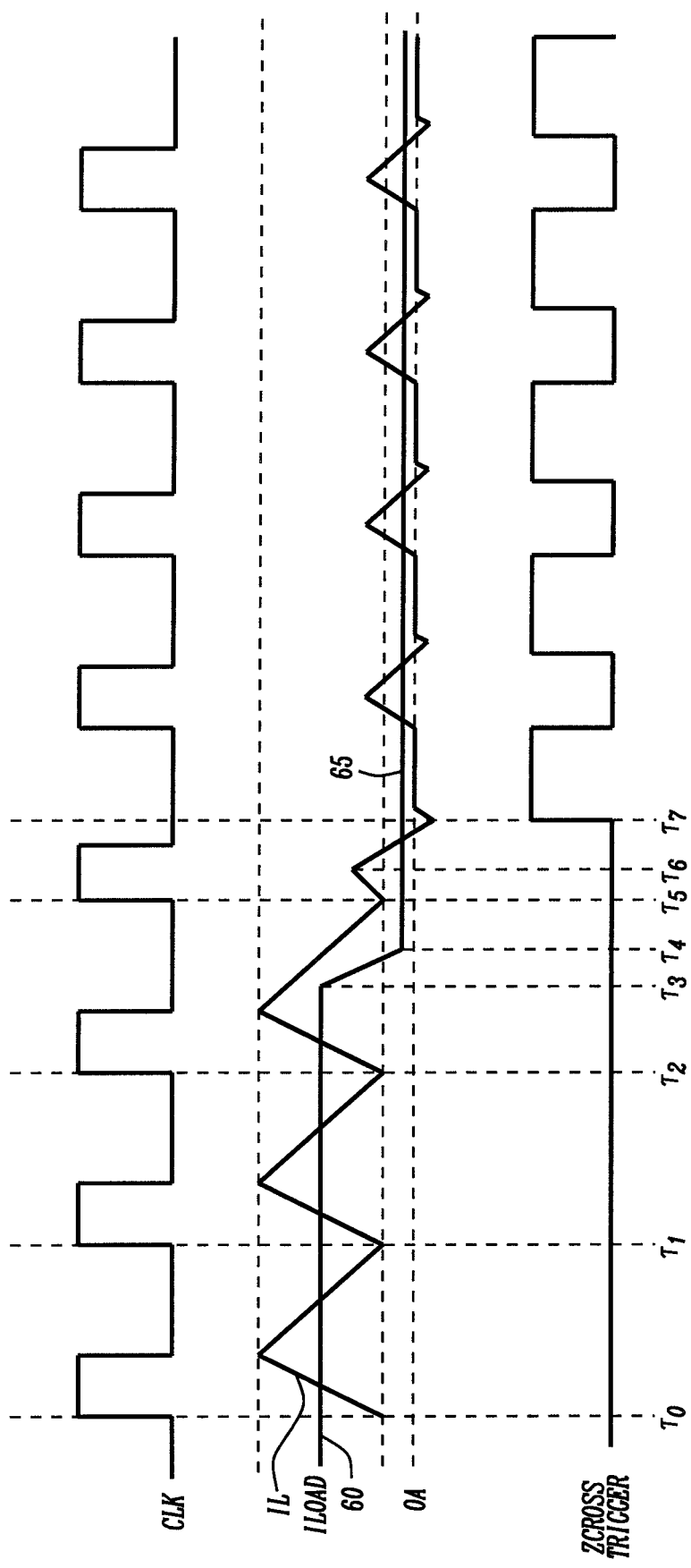
FIG. 7 is a plot of the load current and inductor current of the buck converter of FIG. 3 where the load current changes from a high current load to a lower current load of the related art.

FIG. 7 is a plot of the load current and inductor current IL of the buck converter of FIG. 3 where the load current ILOAD changes from a high current load 60 to a lower current load 65 of the related art. Assuming that the load current ILOAD of the buck converter of FIG. 3 is at a steady state level 60 such that the buck converter is operating in CCM, a step down to the level 65 of the current load ILOAD would cause the zero cross circuit 17 to trigger. There is a cost related issue with the implementation of a usual synchronous rectifier. The comparator of the zero cross circuit 17 and its associated voltage reference VREF2 has to be trimmed or calibrated in order to compensate offset and delays. To maintain the calibration information for operation, a one time programmable read only memory (not shown) must be added to the circuit structure to store the necessary trimming or calibration values.

One of the drawbacks of the comparator of the zero cross circuit 17 is that the comparator consumes a relatively large amount of current to maintain the required operating speed. This becomes more and more important with the use of smaller and smaller inductors L1 and higher input voltages VIN.

In an example, it is assumed that input voltage VIN=10V, the output VOUT=5.0V and the inductor L1=0.6 µH. The demagnetization slope will be determined by the equation:

$|Sdown|=(Vout)/L1=(5.0)/(0.6e-06)=8.33$ MA/s=8.33 mA/ns

This indicates that a typical variation of time delay resulting from variations in process, temperature, and powers supply of 15 ns will cause 125 mA of inaccuracy.

Concerning the case of the change of the level of the load current ILOAD stepping down from the larger level 60 at the time $\tau_1$ to the lower level 65 at the time $\tau_2$, a positive overshoot occurs at the output voltage VOUT of the buck converter at the time $\tau_4$ after the start of the next cycle at the time $\tau_3$. Indeed, when the load current ILOAD has decreased to close to zero amps at the time $\tau_5$, and assuming the loop took a little delay to react, then the inductor current IL has become greater than the load current ILOAD during this delay. Because of the structure of the low side synchronous rectifier switch SR, the inductor current IL cannot be made negative as a corrective action and the first pulse at the time $\tau_4$ in DCM is providing too much magnetization. This overshoot usually causes noise issues in the circuitry using the buck converter.

Figure 8:
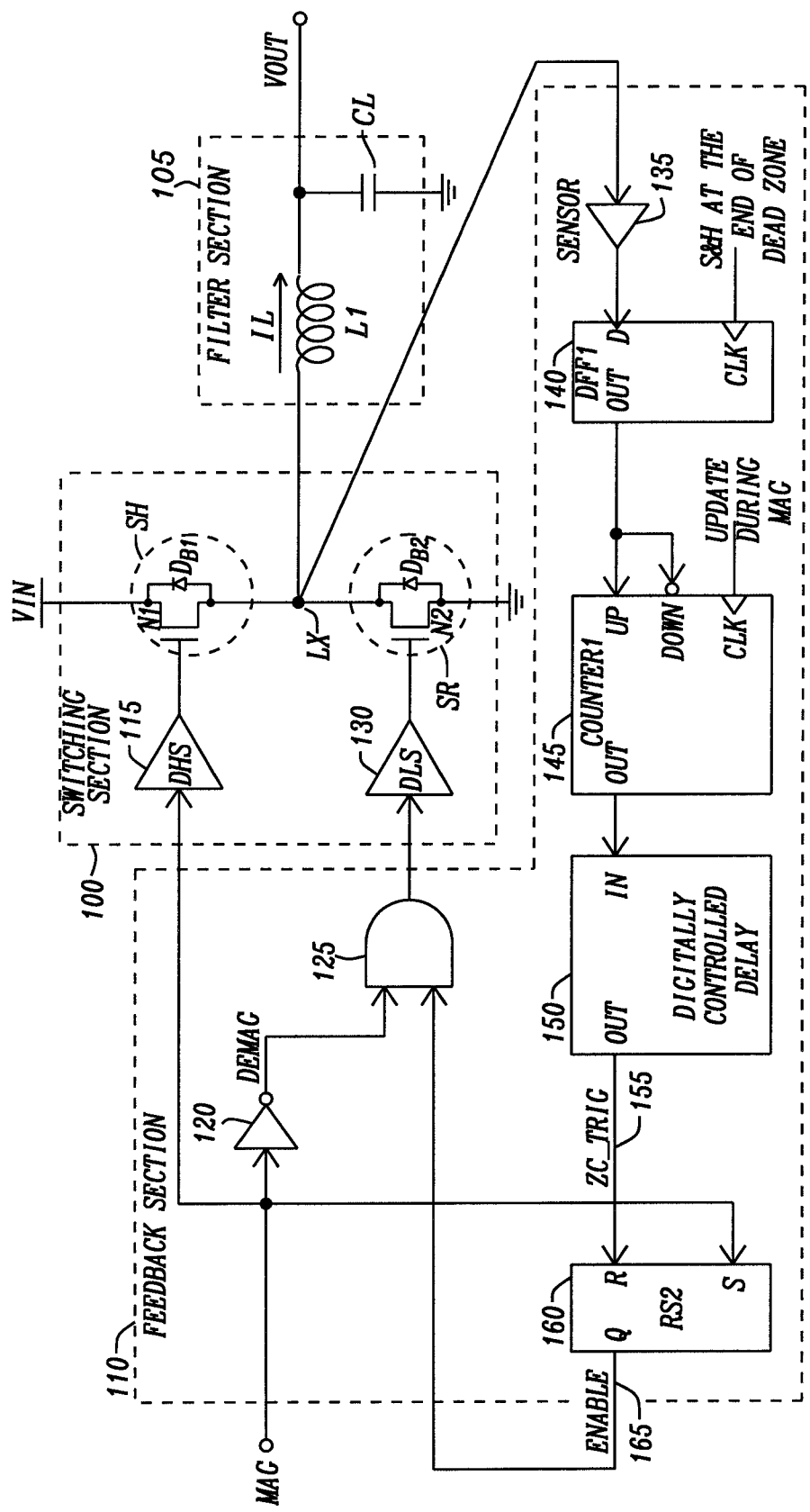
FIG. 8 is a schematic diagram of various embodiments of a switch mode power supply operating as a buck converter embodying the principals of the present disclosure.

FIG. 8 is a schematic diagram of various embodiments of a switch mode power supply operating as a buck converter embodying the principals of the present disclosure. The buck converter has a switching section 100, a filter section 105, and a feedback section 110. The magnetization signal MAG is the input to the high side driver 115. The output of the high side driver 115 is the control input to the high side switch SH. The high side switch SH includes the MOSFET N1 and the body diode $D_{B1}$. This structure is as described in FIG. 3. The feedback section 110 has an inverter 120 that also receives the magnetization signal MAG and inverts the magnetization signal MAG to be the demagnetization signal DEMAG. The demagnetization signal DEMAG is an input to the AND gate 125. The AND gate 125 within the feedback section 110 also receives the enable signal 165 from the feedback section 110. The development of the enable signal 165 will be discussed hereinafter. The output of the AND gate 125 is the input to the low side driver 130. The low side driver 130 controls the input to synchronous rectifier switch SR or low side switch.

The common connection LX between the high side switch SH and the synchronous rectifier switch SR is the output terminal of the switching section 100 and the input to the filter section 105. The filter section 105 is structured as described above with a first terminal of the inductor L1 being connected to the common terminal LX of the high side switch SH and the synchronous rectifier switch SR. The second terminal of the inductor L1 is connected to a first terminal of the load capacitance CL and the junction of the second terminal of the inductor L1 and the first terminal of the load capacitance CL is the output VOUT of the buck converter.

The voltage $V_{LX}$ developed at the common terminal LX is detected by the sensor 135 of the feedback section 110. The sensor 135 develops a digital signal at its output terminal that is related to the magnitude of the voltage $V_{LX}$. The output of the sensor 135 is the data input D of the D-type flip-flop 140. The clock input CLK of the D-type flip-flop 140 receives a sampled and held signal at the end of the demagnetization period, when the synchronous rectifier switch SR is turned off. The output of the D-type flip-flop 140 is applied to the UP count and DOWN count inputs of the counter 145. The clock input CLK of the counter 145 is created at the beginning of the magnetization of the inductor L1. The output of the counter 145 is a count signal applied to the input IN of the digitally controlled delay 150. The count signal is the delay that is to be created by the digitally controlled delay 150. The output OUT of the digitally controlled delay 150 is the zero-crossing trigger 155 that is applied to reset input R of the set-reset latch 160. The set input S of the set-reset latch 160 is the magnetization signal MAG. At the reception of the zero-crossing trigger 155, the enable output of the set-reset latch 160 is disabled to turn off the synchronous rectifier switch SR.

The feedback circuit 110 as coupled to the synchronous rectifier switch SR forms an adaptive synchronous rectifier. The voltage $V_{LX}$ is sensed at the common terminal LX to determine if the zero crossing trigger 155 corresponds to the inductor current IL being negative or positive. The voltage $V_{LX}$ at the common terminal LX is sensed subsequent to the synchronous rectifier switch SR being turned off. If the inductor current IL is less than zero amps, then voltage $V_{LX}$ will increase to the voltage level VIN of the input voltage source plus the voltage $V_{be}$ developed across the body diode $D_{B2}$. Alternately, inductor current IL is greater than zero amps, then the voltage $V_{LX}$ will remain at approximately the voltage level of the ground reference voltage, without taking into account the voltage $V_{be}$ developed across the body diode $D_{B2}$.

The magnitude of the voltage $V_{LX}$ is used to determine if the inductor current IL is positive or negative and thus updates the timer state of the zero crossing trigger 155 for the next cycle. When the voltage $V_{LX}$ at the common terminal LX is observed as being approximately voltage level VIN of the input voltage source plus the voltage $V_{be}$ developed across the body diode $D_{B2}$, the zero crossing trigger 155 will have triggered while the inductor current IL is less than zero amps. In the next cycle, the zero crossing trigger 155 will trigger somewhat earlier to turn off the synchronous rectifier switch SR earlier than for the observed cycle by decrementing the digitally controlled delay 150.

When the voltage $V_{LX}$ at the common terminal LX is observed as being approximately voltage level of approximately the ground reference voltage (0V) indicating that the inductor current IL is positive, the zero crossing trigger 155 assumes a state that resets the set-reset latch 160 to turn off the synchronous rectifier switch SR while the inductor current IL is greater than zero amps.

Figure 9:
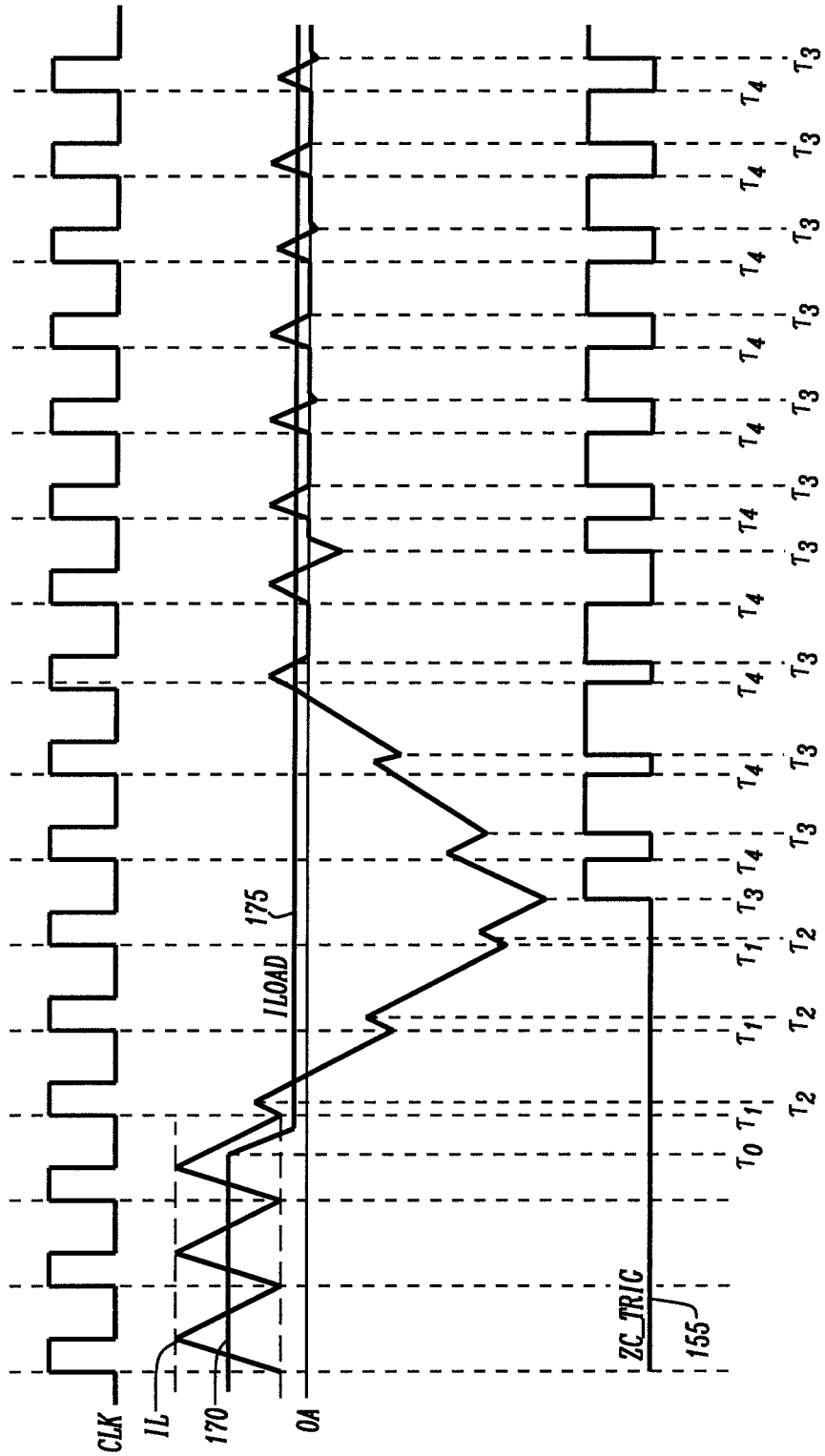
FIG. 9 is a plot of the load current and inductor current of the buck converter of FIG. 8 where the load current changes from a high current load to a lower current load.

FIG. 9 is a plot of the load current ILOAD and inductor current IL of the buck converter of FIG. 8 where the load current ILOAD changes from a high current load 170 to a lower current load 175. The rising edge of the clock pulses CLK trigger the magnetization period of the inductor current IL when the high side switch SH of the switching section 100 is activated. During the magnetization period, the inductor current IL is rising until it reaches a level established to determine the output voltage level VOUT. At this time, the magnetization signal MAG is deactivated as described above for the continuous current mode of operation. At the time $\tau_0$, the load current ILOAD changes from the high current load 170 to a lower current load 175. At the time $\tau_1$, the magnetization signal MAG is activated and the high side switch SH of the switching section 100 is activated. At the time $\tau_2$, the magnetization signal MAG is deactivated and the demagnetization signal DEMAG is deactivated and the inductor current IL decrease to become negative. At the time $\tau_3$, the voltage $V_{LX}$ indicates that the inductor current IL is negative and the counter 145 begins to count down to decrease the period of the digitally controlled delay 150. At each of the times $\tau_4$, the magnetization signal MAG is activated and the inductor current IL increases. When the digital controlled delay 150 has activated the zero crossing trigger 155 is reset and the demagnetization signal DEMAG is activated. The time out of the digital controlled delay 150 causes demagnetization signal DEMAG to be deactivated and the synchronous rectifier switch SR is turned off at the times $\tau_3$. This process continues until the inductor current IL has reached a steady state level providing current to the filter section 105 to satisfy the load current ILOAD demands.

Figure 10:
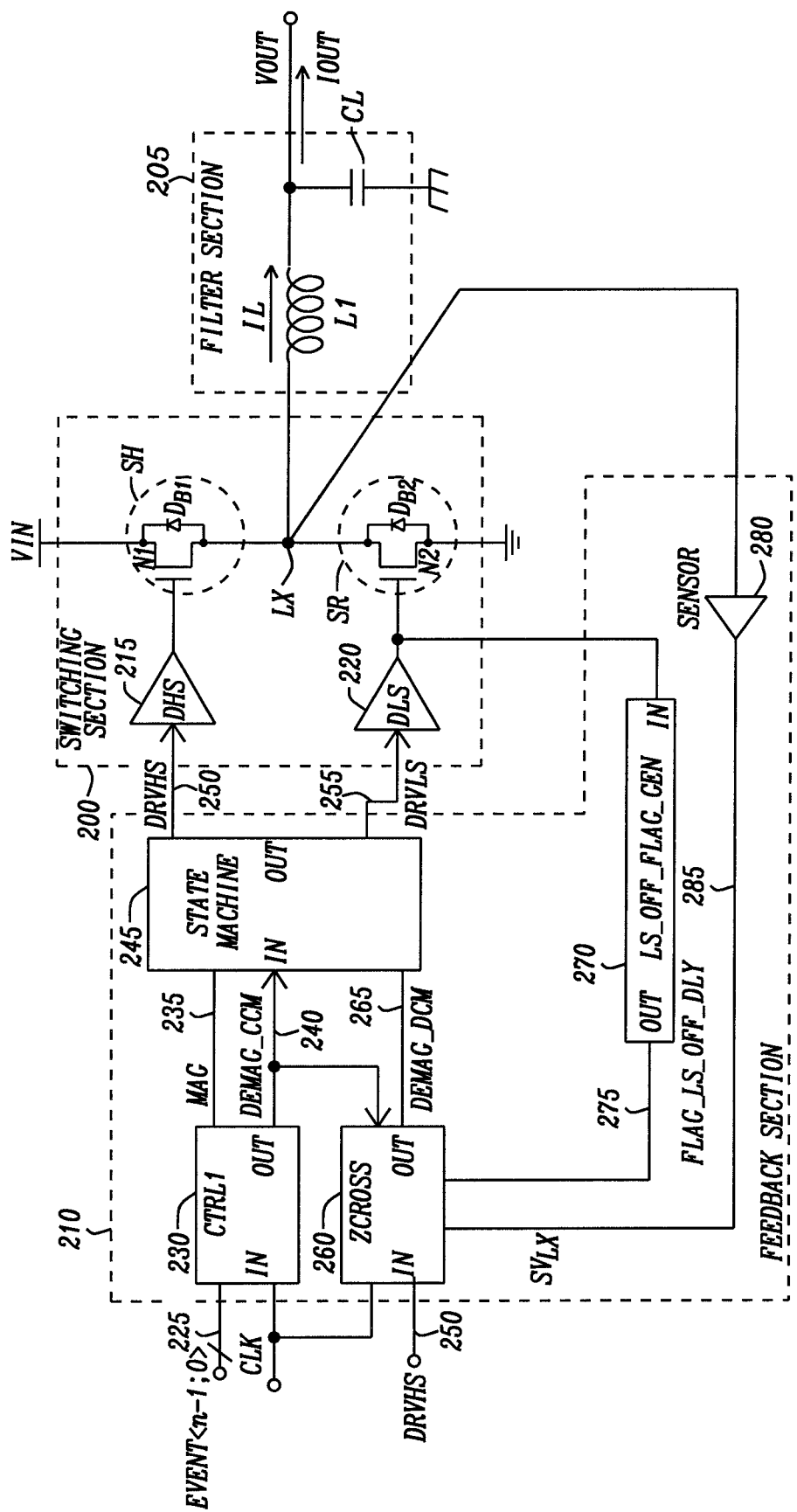
FIG. 10 is a schematic diagram of a switch mode power supply operating as a buck converter embodying the principals of the present disclosure.

FIG. 10 is a schematic diagram of a switch mode power supply operating as a buck converter embodying the principals of the present disclosure. The buck converter has a switching section 200, a filter section 205, and a feedback section 210. The high side driver signal 250 is the input to the high side driver 215 of the switching section 200. The low side driver signal 255 is the input to the low side driver 220. The output of the high side driver 215 is the control input to the high side switch SH. The high side switch SH includes the MOSFET N1 and the body diode $D_{B1}$. The output of the low side driver 220 is the control input to the low side switch or synchronous rectifier switch SR. The synchronous rectifier switch SR includes the MOSFET N2 and the body diode $D_{B2}$. The structure of the high side switch SH and the synchronous rectifier switch SR is as described in FIG. 3.

An event signal 225 provides the feedback loop signal from the output of the buck converter and a signal for setting the times for the magnetization phase and the demagnetization phase of the CCM (continuous conduction mode) operation. The event signal 225 and the clock pulse signal CLK are inputs to the control circuit 230. The outputs of the control circuit 230 are the magnetization signal 235 and the CCM demagnetization signal 240. The feedback section 210 has a state machine 245 that receives the magnetization signal 235, a CCM demagnetization signal 240, and a DCM demagnetization signal 265. The outputs of the state machine 245 are the high side driver signal 250 and the low side driver signal 255.

The clock pulse signal CLK, the high side driver signal 250, and the CCM demagnetization signal 240 are inputs to the zero crossing detection circuit 260. The output of the zero crossing detection circuit 260 is the DCM demagnetization signal 265. The CCM demagnetization signal 240 and the DCM demagnetization signal 265 are generated such that they become active at approximately the same time. When a timer within the zero crossing circuit elapses, the DCM demagnetization signal 265 is deactivated. The state machine 245 receives the DCM demagnetization signal 265 and disables the low side driver signal 255. The low side driver signal 255 from the state machine 245 is an input to a low side driver disabled flag generator 270. The low side driver disabled flag generator 270 delays the low side driver status signal 255 for a period of time and provides the low side driver disabled flag 275 to the zero crossing detection circuit 260.

The voltage $V_{LX}$ developed at the common terminal LX is detected by the sensor 280. The sensor 280 develops a digital signal $SV_{LX}$ at its output terminal 285 that is related to the threshold of the voltage $V_{LX}$. The output 285 of the sensor 235 is applied to the zero crossing circuit 260 for determining the direction of the inductor current IL.

The common connection LX between the high side switch SH and the synchronous rectifier switch SR is the output terminal of the switching section 200 and the input to the filter section 205. The filter section 205 is structured as described above with a first terminal of the inductor L1 being connected to the common terminal LX of the high side switch SH and the synchronous rectifier switch SR. The second terminal of the inductor L1 is connected to a first terminal of the load capacitance CL that is the output VOUT of the buck converter.

Figure 11:
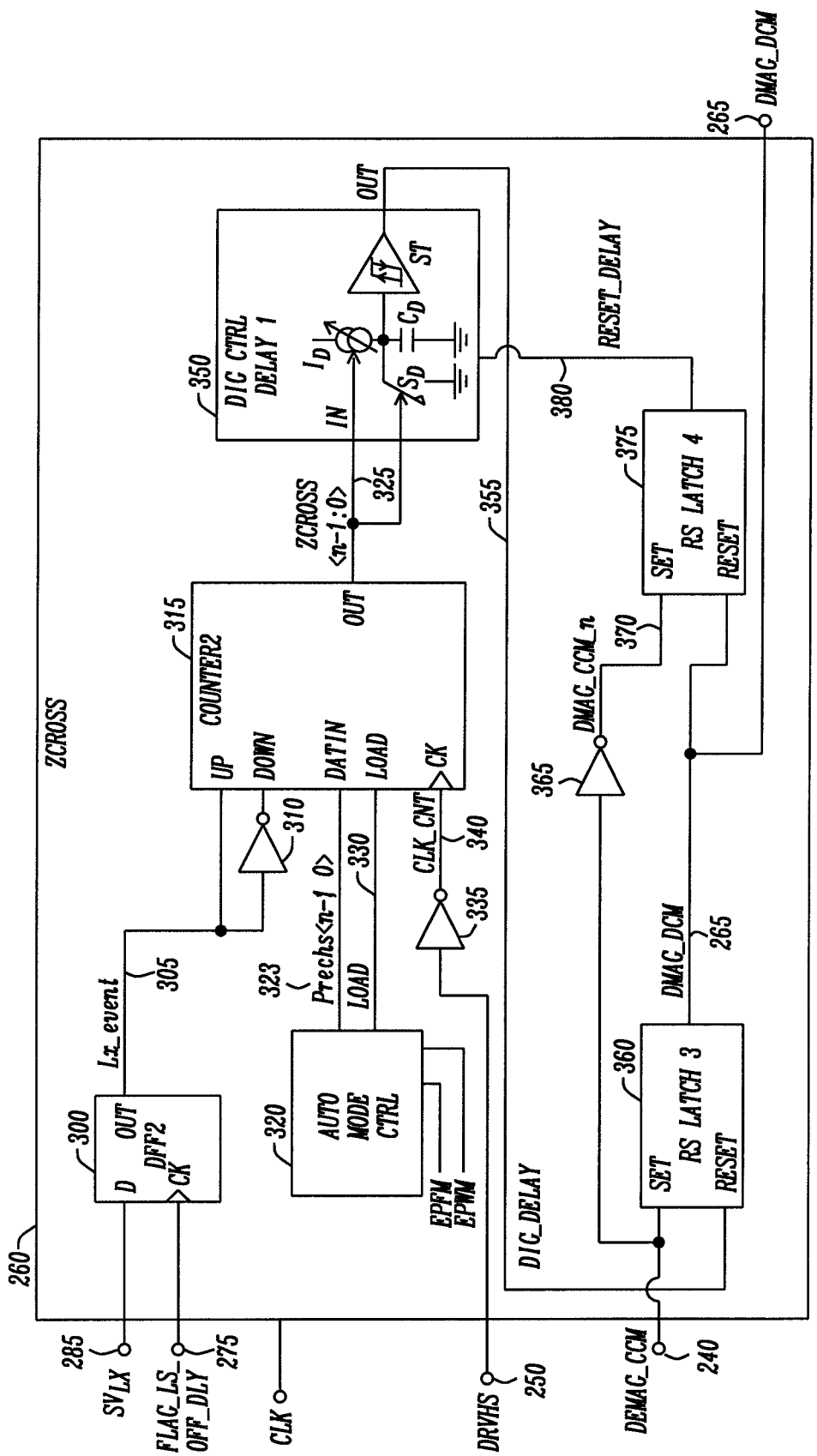
FIG. 11 is a schematic diagram of a zero crossing circuit of the switch mode power supply of FIG. 10 embodying the principals of the present disclosure.

FIG. 11 is a schematic diagram of a zero crossing circuit 260 of the switch mode power supply of FIG. 10 embodying the principals of the present disclosure. The digital signal $SV_{LX}$ at the output terminal 285 of the sensor 280 is applied to the data input D of a D-type Flip-Flop 300. The low side driver disabled flag 275 is connected the clock input CK of the D-type Flip-Flop 300. The D-type Flip-Flop 300 acts as a sample and hold circuit that captures the state of the digital signal $SV_{LX}$ using the low side driver disabled flag 275. As noted above, when the synchronous rectifier switch SR is deactivated, the low side driver status signal is delayed to create the low side driver disabled flag 275. The activated low side driver disabled flag 275 captures the polarity of the digital signal $SV_{LX}$ indicating the positive or negative polarity of the inductor current IL sensed at the node LX. The captured LX event at the node LX is transferred to the data output of the D-type Flip-Flop 300. The data output terminal 305 of the D-type Flip-Flop 300 is applied to the increment input UP of the counter 315. The data output terminal of the D-type Flip-Flop 300 is also applied to an inverter 310. The output of the inverter 310 is connected to the decrement input DOWN of the counter 315. The increment input UP or decrement input DOWN are activated based on the polarity of the inductor current IL. The high side driver signal 250 is applied to an inverter 335. The output of the inverter 335 is applied to the clock input CK of the counter 315. When the high side driver signal 250 is deactivated indicating the beginning of the demagnetization phase, the counter clock signal 340 is activated to start the counter 315 to either increment or decrement depending on the polarity of the inductor current IL during the previous clock CLK cycle.

The output OUT of the counter 315 is a delay code 325 that is applied to the digitally controlled delay circuit 350. The digitally controlled delay circuit 350 is formed of at least one delay circuit. The delay circuit has a variable current source $I_D$ that has a first terminal connected to a power supply voltage source and a second terminal connected to first terminal of a capacitor $C_D$. A control terminal of the variable current source $I_D$ is connected to receive a delay code 325 from the output OUT of the counter 315 for adjusting the current of the variable current source $I_D$ to modify the delay of the digitally controlled delay circuit 350. The second terminal of the capacitor $C_D$ is connected to the ground reference node. A first terminal of a switch $S_D$ is attached to the junction of the second terminal of the current source $I_D$ and the first terminal of the capacitor $C_D$. The second terminal of the switch $S_D$ is connected to the ground reference node. A control terminal of the switch $S_D$ is connected to receive the delay code 325 for activating or deactivating the switch $S_D$ to connect or bypass the capacitor $C_D$ for further adjusting the delay of the digitally controlled delay circuit 350. The number and capacitance value of the capacitors $C_D$ additionally determines the delay of the digitally controlled delay circuit 350. Each capacitor $C_D$ has a switch $S_D$ in parallel with it for inserting one or more of the capacitors $C_D$ in parallel to adjust the delay of the digitally controlled delay circuit 350. The number of capacitors being set by the number of bits in the delay code 325. In various embodiments, the magnitude of the delay code 325 is inversely proportional to the length of time of the period of the delay created by the digitally controlled delay circuit 350. The inverse proportionality of the delay code 325 provides for an easier implementation. If the current of the variable current source $I_D$ is increased, the capacitor $C_D$ charges faster, thus shorting the delay because The Schmitt trigger circuit ST switches earlier. In other embodiments, as mentioned above, tuning the capacitance of the capacitor $C_D$ to have more or less capacitors in parallel, the delay becomes proportional to the digital number of the delay code 325, instead of inversely proportional.

The CCM demagnetization signal 240 is a set input of the set-reset latch 360 to activate the output of the set-reset latch 360. The digital delay output 355 of the digitally controlled delay circuit 350 is the reset input to the set-reset latch 360. When the CCM demagnetization signal 240 is activated, the DCM demagnetization signal 265 is also activated. The activated CCM demagnetization signal 240 and the DCM demagnetization signal 265 are transferred to the state machine 245 of FIG. 10 as described above. The DCM demagnetization signal 265 is applied to the reset terminal of the set-reset latch 375. The CCM demagnetization signal 240 is applied to an input terminal of an inverter 365. The output of the inverter 365 is the negative CCM demagnetization signal 370 that is applied to the set input of the set-reset latch 375. The output of the set-reset latch 375 is the reset delay signal 380. The reset delay signal 380 is activated when the CCM demagnetization signal 240 is deactivated and is activated when the DCM demagnetization signal 265 is deactivated at the end of the delay time when the digital delay signal 355 is activated to reset the set-reset latch 360.

Figure 12:
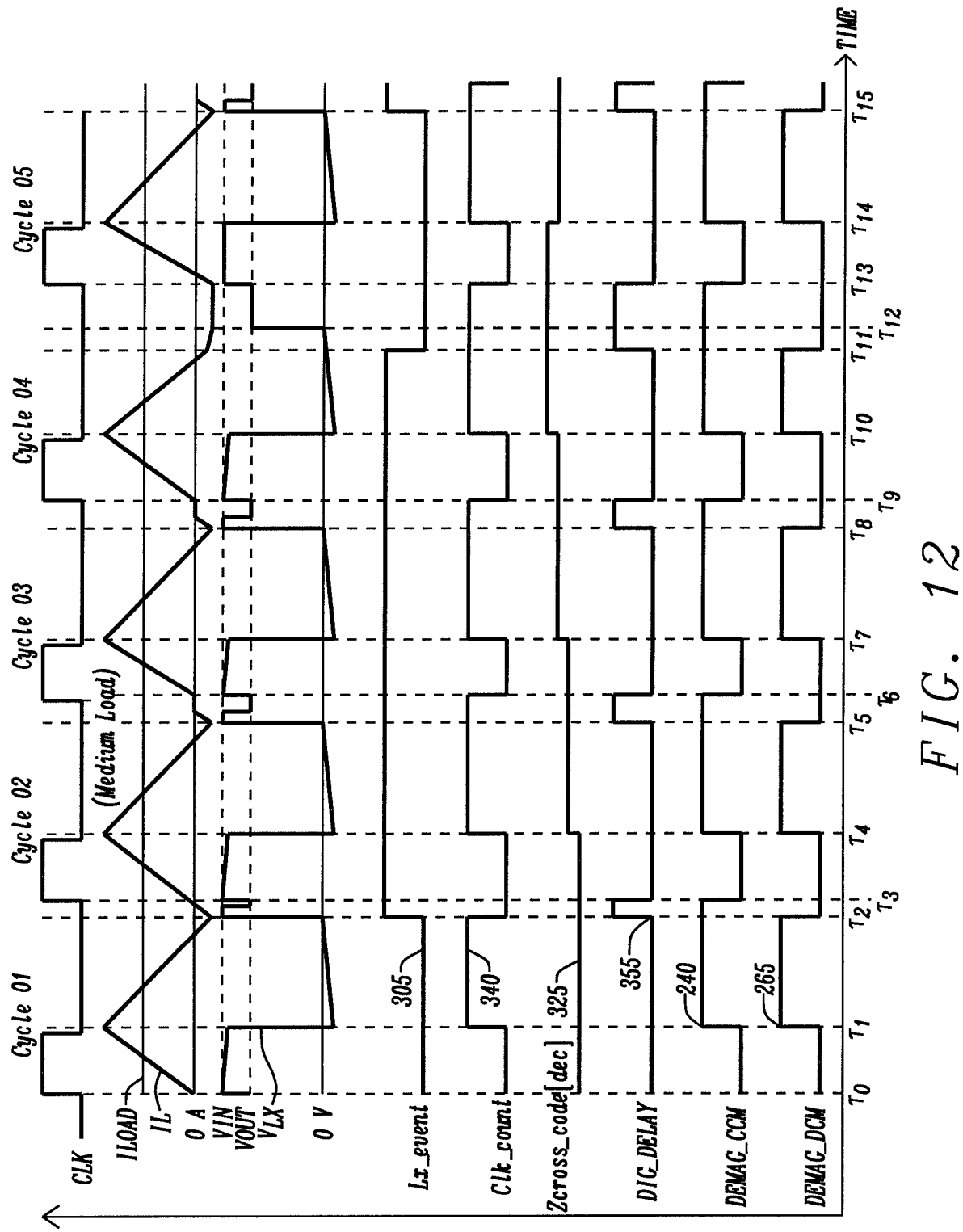
FIG. 12 provides plots of various interconnections of the switch mode power supply illustrating the signals necessary for the operation of the zero crossing circuit embodying the principals of the present disclosure of FIG. 11.

FIG. 12 provides plots of various interconnections of the switch mode power supply illustrating the signals necessary for the operation of the zero crossing circuit embodying the principals of the present disclosure of FIG. 11. Refer now to FIGS. 10, 11, and 12. The plots of FIG. 12 cover five separate cycles. Cycle 01 starts at the time $\tau_0$ and ends at the time $\tau_3$. During the Cycle 01, the clock pulse CLK rising edge occurs at the time $\tau_0$ to initiate a magnetization request. The high side switch SH is activated and the synchronous rectifier switch SR is deactivated a short period of time after the rising edge of the clock pulse CLK. The inductor current IL begins to increase. The low side driver disabled flag 275 rises. From the time $\tau_0$ to the time $\tau_1$, the inductor is magnetizing as the current from the input voltage source is flowing through the inductor L. The data output terminal 305 of the D-type Flip-Flop 300 remains at the deactivated low state. The CCM demagnetization signal 240 is deactivated since the CCM magnetization signal 235 is active. This causes the reset delay 380 to be set to active thus resetting the digitally controlled delay 350 to be equal to the digital zero state. With the high side switch SH conducting the inductor current IL, the inductor current IL is rising with a slope S1=(VIN−VOUT)/L. The voltage $V_{LX}$ at the input node LX is determined by the equation:

$$V_{LX} = VIN - (RDSON_{N1} + R_{PARASITICS}) * IL(t) \quad \text{Eq. 1}$$

Where:
 VIN is the voltage level VIN of the input voltage source,
 $RDSON_{N1}$ is the drain to source resistance conduction of the high driver transistor N1.
 $R_{PARASITICS}$ is the parasitic resistance of the high side switch SH.
 IL(t) is the time dependent value of the inductor current IL.

At the time $\tau_1$, the CCM Demagnetization is initiated and the CCM Demagnetization signal 240 is activated to rise to a digital 1 state. Shortly thereafter, the DCM Demagnetization signal 265 is activated and the set-reset latch 375 is reset to bring the reset delay signal 380 to be deactivated at the digital 0 state to start the internal timer of the digitally controlled delay 350. When the high side driver signal 250 is deactivated, the counter clock signal 340 rises to the digital 1 state. With the counter clock signal 340 activated and the captured event at the node LX being equivalent to the previous cycle, the data output of the D-type Flip-Flop 300 remains at the digital zero state. The output OUT of the counter 315 decrements the delay code 325 by one least significant bit. The digitally controlled delay 350 is updated to provide the new delay based one the new delay code 325.

The low side synchronous rectifier switch SR is activated and the inductor current is decreasing with a slope S2=−VOUT/L The voltage $V_{LX}$ at the input node LX is determined by the equation:

$$V_{LX} = VSS - (RDSON_{N2} + R_{PARASITICS}) * IL(t) \quad \text{Eq. 2}$$

Where:
 VSS is the voltage level of the ground reference node,
 $RDSON_{N2}$ is the drain to source resistance conduction of the low side transistor N2,
 $R_{PARASITICS}$ is the parasitic resistance of the low side switch SL, and
 IL(t) is the time dependent value of the inductor current IL.

At the time $\tau_2$, the digitally controlled delay 350 elapses and the digital delay signal 355 is activated. This causes the DCM demagnetization signal 265 is to be deactivated. This forces state machine 315 to deactivate the low side synchronous rectifier switch SR. Since the inductor current IL is less than zero, the voltage $V_{LX}$ at the input node LX immediately changes to be the voltage level VIN of the input voltage source plus a diode voltage $V_{be}$ drop of the body diode $D_{B1}$ of the high side switch SH that is conducting the inductor current IL. A short period of time after the time $\tau_2$, the low side driver disabled flag 275 is activated and used for sampling the digital signal $SV_{LX}$ at the output terminal 285 of the sensor 280. The captured LX event at the node LX is updated and transferred to the data output of the D-type Flip-Flop 300. The inductor current IL flowing through the body diode $D_{B1}$ of the high side switch SH returns to zero amps.

The voltage $V_{LX}$ at the input node LX now becomes the output voltage VOUT until a new magnetization cycle occurs at the time $\tau_3$.

Cycle 02 starts at the time $\tau_3$ and ends at the time $\tau_6$. During the Cycle 02, the clock pulse CLK rising edge occurs at the time $\tau_3$ to initiate a magnetization request. The high side switch SH is activated and the synchronous rectifier switch SR is deactivated as determined at the time $\tau_2$. The inductor current IL begins to increase. The low side driver disabled flag 275 falls, thus causing the data output terminal 305 of the D-type Flip-Flop 300 to remain at the deactivated low state, since no events are captured right after the end of the demagnetization phase at the time $\tau_3$. The CCM demagnetization signal 240 is deactivated since the CCM magnetization signal 235 is active. This causes the reset delay 380 to be set to active, thus resetting the digitally controlled delay 350 to be equal to zero. With the high side switch SH conducts the inductor current IL, the inductor current IL is rising with a slope S1=(VIN−VOUT)/L. The voltage $V_{LX}$ at the input node LX is determined by the equation Eq. 1.

At the time $\tau_4$, the CCM Demagnetization is initiated and the CCM Demagnetization signal 240 is set to a digital 1 state. Shortly thereafter, the DCM Demagnetization signal 265 is activated and the set-reset latch 375 is reset to bring the reset delay signal 380 to be set at a digital 0 state to start the internal timer of the digitally controlled delay 350. When the high side driver signal 250 is deactivated at the time $\tau_4$, the counter clock signal 340 is activated. With the counter clock signal 340 activated, the output OUT of the counter 315 decrements the delay code 325 by one least significant bit. The digitally controlled delay 350 is updated to provide the new delay based on the new delay code 325 to shorten the delay time of the digitally controlled delay 350 for the next demagnetization phase from the time $\tau_4$ to the time $\tau_5$.

The low side synchronous rectifier switch SR is activated and the inductor current is decreasing with a slope S2=−VOUT/L. The voltage $V_{LX}$ at the input node LX is determined by the equation Eq. 2.

At the time $\tau_5$, the digitally controlled delay 350 elapses and the digital delay signal 355 is activated. This causes the DCM demagnetization signal 265 to be deactivated. This forces state machine 245 to deactivate the low side synchronous rectifier switch SR. Since the inductor current IL is less than zero, the voltage $V_{LX}$ at the input node LX immediately goes to the voltage level VIN of the input voltage source plus a diode voltage $V_{be}$ drop of the body diode $D_{B1}$ of the high side switch SH that is conducting the inductor current IL. A short period of time after the time $\tau_5$, the low side driver disabled flag 275 is activated to provide the sampling of VLX. The captured LX event at the node LX is updated and transferred to the data output of the D-type Flip-Flop 300. The inductor current IL flowing through the body diode $D_{B1}$ of the high side switch SH returns to zero amps between the time $\tau_5$ and the time $\tau_6$. The voltage $V_{LX}$ at the input node LX now decays toward the output voltage VOUT until a new magnetization cycle occurs at the time $\tau_6$. It will be noted that the inductor current IL is less negative when the zero crossing circuit triggers when DCM demagnetization signal 265 is set to the digital 0 state because the counter 315 has incremented by one least significant bit.

Cycle 03 from its start at the time $\tau_6$ and ends at the time $\tau_9$ is essentially the same as Cycle 02. The exception being that the inductor current IL is less negative than during the Cycle 02. The inductor current IL returns earlier than in Cycle 02 and remains at approximately zero amps until the time $\tau_9$ when the clock pulse CLK rising edge occurs.

Cycle 04 starts at the time $\tau_9$ and ends at the time $\tau_{13}$. During the Cycle 04, the clock pulse CLK rising edge occurs at the time $\tau_9$ to initiate a magnetization request. The high side switch SH is activated and the synchronous rectifier switch SR remains deactivated. The inductor current IL begins to increase. The data output terminal 305 of the D-type Flip-Flop 300 remains at the activated high state since there is no sampling of the digital signal $SV_{LX}$. The CCM demagnetization signal 240 is deactivated since the CCM magnetization signal 235 is active. This causes the reset delay 380 to be set to active resetting the digitally controlled delay 350 to be equal to zero. With the high side switch SH conducting the inductor current IL, the inductor current IL is rising with a slope $S1=(VIN-VOUT)/L$. The voltage $V_{LX}$ at the input node LX is determined by the equation Eq. 1.

At the time $\tau_{10}$, the CCM Demagnetization is initiated due to an event such as the regulation loop requiring the inductor current IL to begin decreasing. The CCM Demagnetization signal 240 is set to a digital 1 state. Shortly thereafter, the DCM Demagnetization signal 265 is activated and the set-reset latch 375 is reset to bring the reset delay signal 380 to be set at a digital 0 state to start the internal timer of the digitally controlled delay 350. When the high side driver signal 250 is deactivated the counter clock signal 340 is activated. The high side switch SH is deactivated and the synchronous rectifier switch SR is activated a shortly thereafter. With the counter clock signal 340 activated and the captured event at the node LX is unchanged from the previous cycle, the data output of the D-type Flip-Flop 300 is remains at the digital 1 state to cause, the output OUT of the counter 315 to increment the delay code 325 by one least significant bit. The timer of the digitally controlled delay circuit 350 is updated to provide the new delay based on the new delay code 325.

The low side synchronous rectifier switch SR is activated and the inductor current is decreasing with a slope $S2=-VOUT/L$. The voltage $V_{LX}$ at the input node LX is determined by the equation Eq. 2.

At the time $\tau_{11}$ the digitally controlled delay 350 time elapses and the digital delay signal 355 is activated. This causes the DCM demagnetization signal 265 to be deactivated. This forces state machine 245 to deactivate the low side synchronous rectifier switch SR. Since the inductor current IL is greater than zero, the voltage $V_{LX}$ at the input node LX remains at a voltage level of a diode voltage $V_{be}$ of the body diode $D_{B2}$ of the low side synchronous rectifier switch SR that is conducting the inductor current IL. A short period of time after the time $\tau_{11}$ the low side driver disabled flag 275 is activated and used to sample the fact that the voltage $V_{LX}$ has not risen. The captured LX event at the node LX is transferred to the data output 305 of the D-type Flip-Flop 300 and the data output 305 of the D-type Flip-Flop 300 is set at the digital 0 state. The inductor current IL flowing through the body diode $D_{B2}$ of the low side synchronous rectifier switch SR returns to zero amps at the time $\tau_{12}$. The voltage $V_{LX}$ at the input node LX remains at the output voltage VOUT until a new magnetization cycle occurs at the time $\tau_{13}$.

Cycle 05 starts at the time $\tau_{13}$. During the Cycle 05, the clock pulse CLK rising edge occurs at the time $\tau_{13}$ to initiate a magnetization request. The high side switch SH is activated a short period of time after the rising edge of the clock pulse CLK. The synchronous rectifier switch SR was deactivated prior to the start of the Cycle 05 at the time $\tau_{12}$. The inductor current IL begins to increase. The data output terminal 305 of the D-type Flip-Flop 300 remains at the deactivated digital 0 state. The CCM demagnetization signal 240 is deactivated since the CCM magnetization signal 235 is active. This causes the reset delay 380 to be set to active resetting the digitally controlled delay 350 to be equal to zero. With the high side switch SH conducting the inductor current IL, the inductor current IL is rising with a slope $S1=(VIN-VOUT)/L$. The voltage $V_{LX}$ at the input node LX is determined by the equation Eq. 1.

At the time $\tau_{14}$, the CCM Demagnetization is initiated and the CCM Demagnetization signal 240 is set to a digital 1 state. Shortly thereafter, the DCM Demagnetization signal 265 is activated and the set-reset latch 375 is reset to bring the reset delay signal 380 to be set at a digital 0 state to start the internal timer of the digitally controlled delay 350. When the high side driver signal 250 is deactivated the counter clock signal 340 is activated. With the counter clock signal 340 activated and the event at the node LX indicating that the event is identical to the previous state, the data output 305 of the D-type Flip-Flop 300 remains deactivated to the digital zero state. The output OUT of the counter 315 decrements the delay code 325 by one least significant bit. The digitally controlled delay 350 is updated to provide the new delay based one the new delay code 325.

The low side synchronous rectifier switch SR is activated and the inductor current is decreasing with a slope $S2=-VOUT/L$. The voltage $V_{LX}$ at the input node LX is determined by the equation Eq. 2.

At the time $\tau_{15}$, the digitally controlled delay 350 elapses and the digital delay signal 355 is activated. This causes the DCM demagnetization signal 265 is to be deactivated. This forces state machine 315 to deactivate the low side synchronous rectifier switch SR. Since the inductor current IL is less than zero, the voltage $V_{LX}$ at the input node LX immediately to the voltage level VIN of the input voltage source plus a diode voltage $V_{be}$ of the body diode $D_{B1}$ of the high side switch SH that is conducting the inductor current IL. A short period of time after the time $\tau_{15}$, the low side driver disabled flag 275 is activated and used to sample the voltage $V_{LX}$ that has risen. The captured LX event at the node LX is updated and transferred to the data output of the D-type Flip-Flop 300. The inductor current IL flowing through the body diode $D_{B1}$ of the high side switch SH returns to zero amps. The voltage $V_{LX}$ at the input node LX now decreases to the output voltage VOUT until a new magnetization cycle occurs Subsequent to the new magnetization cycle that occurs after the time $\tau_{15}$, the function of zero crossing detection circuit 260 will toggle between the Cycle 04 and the Cycle 05, as long as the load current ILOAD does not vary appreciably. The inductor current will change from positive to negative current dependent upon the fluctuations of the triggering of the digitally controlled delay 355.

The automatic mode control circuit 320 allows the buck converter to transition from a pulse width modulation to a pulse frequency modulation. The enable pulse width modulation signal EPWM and enable pulse frequency modulation signal EPFM are inputs to the automatic mode control circuit 320. While in Pulse Width Modulation mode (PWM) and having a load current that forces the DCM mode the zero crossing circuit 260 may be in a steady state. If through a manual or automatic request the buck converter is set into Pulse Frequency Modulation (PFM) then the previous steady state of the zero crossing circuit 260 will be disturbed and the zero crossing circuit 260 will have to re-adapt itself because the demagnetization may be started from a different inductor peak current value. The automatic mode control circuit 320 has an output providing a count preset signal 323 to preset the initial value of the counter 315. The load signal 330 is a triggering signal to the load input of the counter 315 to initiate the transfer of the count preset signal 323 to the data input of the counter 315.

While in PFM mode, the input voltage VIN, output voltage VOUT and inductance of the inductor L1 are known. It is then possible to find out the length of time necessary to go from the peak inductor current $IL_{PEAK}$ of the inductor IL to zero amps.

The peak inductor current $IL_{PEAK}$ is defined in PFM mode and the inductor slope S2 in demagnetization phase is:

$$|S2|=(VOUT)/L1 \text{ in A/s}$$

$$\text{Time\_Out}=IL\text{peak}/S2$$

The zero crossing circuit 260 is structured to preset the counter 315 to a coarse value to force the inductor current IL at the end of a first PFM cycle. However, while in PFM mode with the zero crossing circuit 260 in steady state, the transition to PWM with a higher inductor peak current could cause the synchronous rectifier switch SR to turn off with the inductor current IL still dramatically greater than zero amps, because the delay of the zero crossing circuit 260 has not been greatly modified. This could result in the destruction of the high side switch SH. To prevent destruction of the high side switch SH, the digitally controlled delay 350 in the zero crossing circuit 260 is reset such that jumping from PFM mode to PWM mode does not cause early triggering of the high side switch SH thus preventing destruction.

Figure 13:
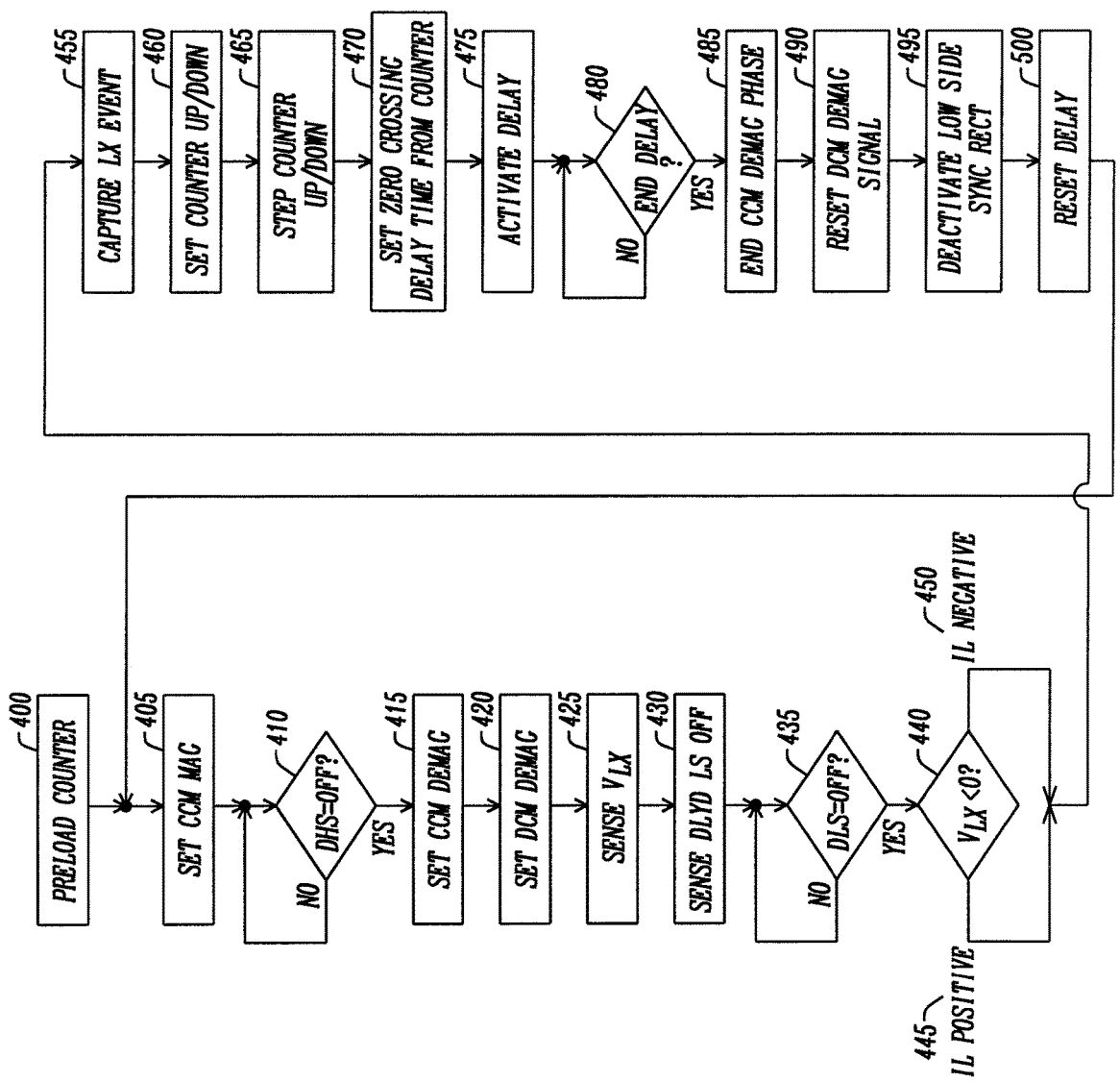
FIG. 13 is a flow chart of a process for controlling a synchronous rectifier embodying the principals of the present invention.

FIG. 13 is a flow chart of a process for controlling a synchronous rectifier embodying the principals of the present invention. Refer now FIGS. 10, 11, and 13. The counter 315 is loaded (Box 400) by the count preset signal 323 from the automatic mode control circuit 320 to preset the initial value of the counter 315. The count preset signal 323 determines the primary count value of the counter 315.

The high side driver SH is activated to set (Box 405) the buck converter in to the CCM magnetization mode. The high side driver signal 250 is examined (Box 410) to determine if the high side driver SH is deactivated. If the high side driver SH is not deactivated, the examination (Box 410) continues until the high side driver SH is deactivated. The CCM demagnetization signal 240 is set (Box 415) and the DCM demagnetization signal 265 is set (Box 420) shortly thereafter.

The inductor voltage $V_{LX}$ at the input node LX of the inductor L1 is sensed (Box 425) to determine the polarity of the inductor current IL. The state of the low side synchronous rectifier switch SR is sensed and the sensing is delayed (Box 430) to set the low side driver disabled flag 275. The state of the low side driver disabled flag 275 is examined (Box 435) to determine if the low side synchronous rectifier switch SR is deactivated. When the low side synchronous rectifier switch SR is not deactivated, the low side synchronous rectifier switch SR continues to be examined (Box 435) until it is deactivated. At the deactivation of the low side synchronous rectifier switch SR, the state of the digital signal $SV_{LX}$ is examined (Box 440) to determine if the inductor current IL is less than zero amps. The polarity of the inductor current IL is captured (Box 455) as a positive inductor current event 445 or a negative inductor current event 450. The counter is set (Box 460) to decrement if the captured (Box 455) event is a positive inductor current event 445 and to decrement if the captured (Box 455) event is a negative inductor current event 450. The counter is incremented or decremented (Box 465) and at the completion of the count, the zero crossing delay time is set (Box 470) from the counter. The digitally controlled delay 315 is activated (Box 475). The digitally controlled delay 315 is monitored (Box 480) for completion. At the start of the demagnetization phase, the CCM demagnetization signal 240 is deactivated (Box 485) and is set to the digital zero state. At the completion of the digital delay, the DCM demagnetization signal 265 is reset (Box 490). In turn, the low side synchronous rectifier switch SR is deactivated (Box 495) and the digitally controlled delay 350 is reset (Box 500). The next cycle begins with the setting of the CCM magnetization (Box 405) to turn on the high side driver SH.

In particular, the switch mode power converter in this disclosure has been described as a buck converter. It would be apparent to one skilled in the art that the zero crossing circuit 260 could be employed in a boost converter. In the boost converter, the inductor has its first terminal connected to the input voltage source and its second terminal connected to the common connection between the high side switch and the low side switch. The high side switch has its first terminal connected to the common connection and a second terminal connected to the output load. The low side switch has its first terminal connected to the common connection and its second connection connected to the ground reference node. The state machine of this disclosure is connected to the control terminals of the high side switch and the low side switch to control the flow of the current through the inductor. The zero crossing circuit of this invention monitors the inductor current flow and controls the flow of the current in the low side switch. The main feature of this disclosure ensures that at the end of the successive demagnetizations, the inductor current IL is approximately 0A. The cycle-by-cycle adjustment of the duration of the demagnetization phase is based on the sampling of the inductor voltage $V_{LX}$ at the input node LX of the inductor L1 for determining the polarity of the inductor current IL of the previous cycle. This sampling information indicates that the duration of period of the previous demagnetization was too short (the inductor current IL is still positive) or too long (the inductor current IL is negative).

While this disclosure has been particularly shown and described with reference to the preferred embodiments thereof, it will be understood by those skilled in the art that various changes in form and details may be made without departing from the spirit and scope of the disclosure.

What is claimed is:

1. A switch mode power supply that functions in a continuous current mode and a discontinuous mode comprising:
   feedback section configured for sensing a voltage at an input terminal of a filter section of the switch mode power supply to determine if a negative current is flowing in an inductor, and controlling an operational state of a switching section of the switch mode power supply such that the inductor current becomes approximately zero amperes at the end of a demagnetization phase of operation, wherein the feedback section comprises:

a current sinking switch deactivation status generator connected to an input of a current sinking switch for receiving a current sinking switch status signal indicating that the current sinking switch is activated or deactivated and configured for delaying the current sinking switch status signal to allow for parasitic capacitance at the input of the inductor to charge;

a continuous current control circuit that is configured for receiving a clocking signal, a feedback loop signal from the output of the switch mode power supply, a current limit signal, and is configured for generating a continuous current magnetization signal and a continuous current demagnetization signal for controlling activation and deactivation of a current sourcing switch and the current sinking switch of the switching section of the switch mode power supply during the continuous current mode of the switch mode power supply;

a switch driver control circuit connected to the continuous current control circuit and configured for receiving the continuous current magnetization signal and a continuous current demagnetization signal, and configured for generating a current sourcing switch driver signal and a current sinking switch driver signal for transfer to the switching section for activating and deactivating the current sourcing switch and the current sinking switch in the switching section;

a zero crossing control circuit connected to the current sinking switch deactivation status generator to receive the current sinking switch status signal indicating when the current sinking switch is deactivated and configured for receiving the clocking signal, the current sourcing switch driver signal to determine that the current sourcing switch within the switching section is activated or deactivated, and a demagnetization activation signal from the continuous current control circuit to determine when the current sinking switch is to be activated or deactivated, and an inductor current polarity signal based on a voltage present at an input to the inductor, and configured for determining when a polarity of the inductor current is positive or negative, and configured for generating a discontinuous current mode demagnetization signal and transferring the discontinuous current mode demagnetization signal to the switch driver control circuit such that the switch driver control circuit is able to control activation and deactivation of the current sinking switch to force the inductor current to become approximately zero amperes at the end of a demagnetization phase of operation; and an inductor input voltage sensor for receiving a signal indicating a level of the voltage present at an input of the filter section of the switch mode power supply and generating the inductor current polarity signal for transfer to the zero crossing control circuit.

2. The switch mode power supply of claim 1 wherein the zero crossing control circuit comprises:

a sample and hold circuit configured for receiving a delayed current sinking switch deactivation status signal and the inductor current polarity signal from the inductor input voltage sensor for sampling the inductor current polarity signal to capture the inductor current polarity;

a delay counter in communication with the sample and hold circuit for receiving the sampled inductor current polarity signal to determine if the counter is to be decremented or incremented based on the polarity of the inductor current for providing a delay count;

a mode control circuit in communication with the delay counter for providing an initial delay count to the delay counter, wherein the initial delay count is incremented or decremented by the delay counter;

a digitally controlled delay circuit in communication with the delay counter to receive the delay count and configured for providing a delay time signal when the delay time specified by the delay count has elapsed;

a demagnetization control circuit in communication with the continuous current control circuit for receiving the continuous current demagnetization signal and in communication with the digitally controlled delay circuit to receive the digital delay signal indicating that the delay time has elapsed, from the continuous current demagnetization signal activating the discontinuous current demagnetization signal and from the delay signal deactivating the discontinuous current demagnetization signal that is provided to the state machine to determine when the current sinking switch is deactivated; and a delay reset circuit in communication with the continuous current control circuit for receiving the continuous current demagnetization signal to be activated when the continuous current demagnetization signal is deactivated and in communication with the demagnetization control circuit to receive the discontinuous current demagnetization signal for deactivating when the discontinuous current demagnetization signal is activated, and in communication with the digitally controlled delay circuit to provide a digital reset signal for reinitializing the digitally controlled delay circuit.

3. The switch mode power supply of claim 2 wherein the delay time of the digitally controlled delay circuit is inversely proportional to a magnitude of the delay count.

4. The switch mode power supply of claim 2 wherein the delay time of the digitally controlled delay circuit is directly proportional to a magnitude of the delay count.

5. The switch mode power supply of claim 1 wherein the switch mode power supply is a step-down buck DC-DC power converter or a step-up boost DC-DC power converter.

6. A zero crossing control circuit within a switch mode power supply that monitors a demagnetization mode of operation and determines a polarity of an inductor current for controlling an operational state of a switching section of the switch mode power supply such that the inductor current becomes approximately zero amperes at the end of a demagnetization phase of operation, the zero crossing control circuit comprising:

an inductor input voltage sensor for receiving a signal indicating a level of a voltage present at an input of a filter section of the switch mode power supply and providing an inductor current polarity signal;

a sample and hold circuit configured for receiving a delayed current sinking switch deactivation status signal and the inductor current polarity signal from the inductor input voltage sensor for sampling the inductor current polarity signal to capture the inductor current polarity;

a delay counter in communication with the sample and hold circuit for receiving the sampled inductor current polarity signal to determine if the counter is to be decremented or incremented based on the polarity of the inductor current for providing a delay count;

a mode control circuit in communication with the delay counter for providing an initial delay count to the delay counter, wherein the initial delay count is incremented or decremented by the delay counter;

a digitally controlled delay circuit in communication with the delay counter to receive the delay count and configured for providing a delay time signal when the delay time specified by the delay count has elapsed;

a demagnetization control circuit configured for receiving a continuous current demagnetization signal and in communication with the digitally controlled delay circuit to receive the digital delay signal indicating that the delay time has elapsed, from the continuous current demagnetization signal activating the discontinuous current demagnetization signal and from the delay signal deactivating the discontinuous current demagnetization signal that is provided to the state machine to determine when the current sinking switch is deactivated; and a delay reset circuit in communication with the continuous current control circuit for receiving the continuous current demagnetization signal to be activated when the continuous current demagnetization signal is deactivated and in communication with the demagnetization control circuit to receive the discontinuous current demagnetization signal for deactivating when the discontinuous current demagnetization signal is activated, and in communication with the digitally controlled delay circuit to provide a digital reset signal for reinitializing the digitally controlled delay circuit.

7. The zero crossing circuit of claim 6 wherein the switch mode power supply is a step-down buck DC-DC power converter or a step-up boost DC-DC power converter.

8. The zero crossing circuit of claim 6 wherein the switch mode power supply functions in a continuous current mode and a discontinuous mode and comprises:

feedback section configured for sensing an inductor current of an output of the switch mode power supply, sensing a voltage at an input terminal of a filter section of switch mode power supply to determine if a negative current is flowing in an inductor, and controlling an operational state of the switching section of the switch mode power supply such that when the inductor current becomes approximately zero amperes at the end of a demagnetization phase of operation.

9. The zero crossing circuit of claim 8 wherein the feedback section comprises:

the continuous current control circuit that is configured for receiving a clocking signal, a feedback loop signal from the output of the switch mode power supply, a minimum on time signal and a minimum off time for setting the times for a magnetization phase and the demagnetization phase of a continuous conduction mode operation, and configured for generating a continuous current magnetization signal for transfer to the demagnetization control circuit, and configured for generating a continuous current demagnetization signal for controlling activation and deactivation of a current sourcing switch and a current sinking switch of the switching section of the switch mode power supply during the continuous current mode of the switch mode power supply.

10. The zero crossing circuit of claim 9 wherein the feedback section further comprises:

a current sinking switch deactivation status generator connected to an input of the current sinking switch for receiving a current sinking switch status signal indicating that the current sinking switch is activated or deactivated and configured for delaying the current sinking switch status signal to allow for parasitic capacitance at the input of the inductor to charge before the current sinking switch status signal is transferred to the zero crossing control circuit to indicate when the current sinking switch is deactivated.

11. The zero crossing circuit of claim 6 wherein the delay time of the digitally controlled delay circuit is inversely proportional to a magnitude of the delay count.

12. The zero crossing circuit of claim 6 wherein the delay time of the digitally controlled delay circuit is directly proportional to a magnitude of the delay count.

* * * * *